United States Patent
Kodama

(10) Patent No.: US 10,312,546 B2
(45) Date of Patent: Jun. 4, 2019

(54) NON-AQUEOUS LIQUID ELECTROLYTE FOR SECONDARY BATTERY AND SECONDARY BATTERY

(71) Applicant: FUJIFILM CORPORATION, Tokyo (JP)

(72) Inventor: Kunihiko Kodama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 931 days.

(21) Appl. No.: 14/601,321

(22) Filed: Jan. 21, 2015

(65) Prior Publication Data

US 2015/0132639 A1    May 14, 2015

Related U.S. Application Data

(63) Continuation of application No. PCT/JP2013/069866, filed on Jul. 23, 2013.

(30) Foreign Application Priority Data

Jul. 27, 2012    (JP) .................. 2012-167705

(51) Int. Cl.
*H01M 10/0567*    (2010.01)
*H01M 4/131*    (2010.01)
(Continued)

(52) U.S. Cl.
CPC ....... *H01M 10/0567* (2013.01); *H01M 4/131* (2013.01); *H01M 4/133* (2013.01);
(Continued)

(58) Field of Classification Search
CPC ......... H01M 10/0525; H01M 10/0567; H01M 2004/027; H01M 2004/028;
(Continued)

(56) References Cited

U.S. PATENT DOCUMENTS 5,853,917 A * 12/1998 Fauteux .............. H01M 4/0442
429/331
2003/0157413 A1* 8/2003 Chen .................. H01M 10/052
429/326
(Continued)

FOREIGN PATENT DOCUMENTS

JP    2003-86248 A    3/2003
JP    2009-123499    *    4/2009    ............ H01M 10/36
(Continued)

OTHER PUBLICATIONS

International Search Report of PCT/JP2013/069866, dated Oct. 8, 2013. [PCT/ISA/210].

*Primary Examiner* — Lucas J. O'Donnell
(74) *Attorney, Agent, or Firm* — Sughrue Mion, PLLC

(57) ABSTRACT

A non-aqueous liquid electrolyte for a secondary battery, containing an electrolyte and a compound (A) represented by any one of formulae (I-1) to (I-3) in an organic solvent:

(Continued)

-continued

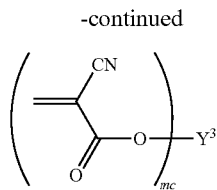

(I-3)

wherein $X^1$ represents an alkyl group substituted with a halogen atom; $Y^1$ represents a hydrogen atom or an organic group; and ma represents an integer from 1 to 6; wherein $X^2$ represents a group having an oxygen atom; $Y^2$ represents a hydrogen atom or an organic group; and mb represents an integer from 1 to 6; and wherein $Y^3$ represents an organic group having 4 or more carbon atoms, or an organic group having an oxygen atom or a nitrogen atom; and mc represents an integer from 1 to 6.

16 Claims, 2 Drawing Sheets

(51) Int. Cl.
*H01M 4/133* (2010.01)
*H01M 4/485* (2010.01)
*H01M 4/505* (2010.01)
*H01M 4/525* (2010.01)
*H01M 4/587* (2010.01)
*H01M 10/0525* (2010.01)
*H01M 4/02* (2006.01)

(52) U.S. Cl.
CPC ........... *H01M 4/485* (2013.01); *H01M 4/505* (2013.01); *H01M 4/525* (2013.01); *H01M 4/587* (2013.01); *H01M 10/0525* (2013.01); H01M 2004/027 (2013.01); H01M 2004/028 (2013.01); H01M 2300/0025 (2013.01)

(58) Field of Classification Search
CPC ......... H01M 2300/0025; H01M 4/131; H01M 4/133; H01M 4/485; H01M 4/505; H01M 4/525; H01M 4/587
See application file for complete search history.

(56) References Cited

U.S. PATENT DOCUMENTS

2009/0023075 A1* 1/2009 Oh ................. H01M 10/052
429/326
2011/0045361 A1* 2/2011 Abe ................ H01M 10/0568
429/343
2013/0004839 A1* 1/2013 Utsumi ............ H01M 10/0567
429/199

FOREIGN PATENT DOCUMENTS

JP 2009-123499 A 6/2009
JP 2013-122901 A 6/2013

* cited by examiner

NON-AQUEOUS LIQUID ELECTROLYTE FOR SECONDARY BATTERY AND SECONDARY BATTERY

CROSS-REFERENCE TO RELATED APPLICATIONS

This application is a Continuation of PCT International Application No. PCT/JP2013/069866 filed on Jul. 23, 2013, which claims priority under 35 U.S.C. § 119 (a) to Japanese Patent Application No. 2012-167705 filed on Jul. 27, 2012. Each of the above applications is hereby expressly incorporated by reference, in its entirety, into the present application.

FIELD OF THE INVENTION

The present invention relates to a non-aqueous liquid electrolyte for a secondary battery containing an organic solvent, and to a secondary battery using the same.

BACKGROUND ART

Secondary batteries called lithium ion batteries, currently attracting attention. They can broadly be classified into two categories of so called lithium ion secondary batteries and lithium metal secondary batteries. The lithium metal secondary batteries utilize precipitation and dissolution of lithium for the operation. Besides, the lithium ion secondary batteries utilize storage and release of lithium in the charge-discharge reaction. These batteries both can provide charge-discharge at large energy densities as compared with lead batteries or nickel-cadmium batteries. By making use of this characteristic, in recent years, these batteries have been widely applied to portable electronic equipment, such as camera-integrated VTR's (video tape recorders), mobile telephones, and notebook computers. In accordance with a further expansion of applications, the development of light-weight lithium ion secondary batteries such as to allow high energy densities has been advanced, as a power source of the portable electronic equipment. Further in recent years, durability, long service life, and safety are also strongly required, with the inclusion of a power source of the automobiles.

Regarding a liquid electrolyte, a particular combination of materials has widely been employed, for lithium ion secondary batteries or lithium metal secondary batteries (hereinafter, these may be collectively referred to simply as a lithium secondary battery), in order to realize high electric conductivity and potential stability. That is, a carbonic acid ester-based solvent, such as propylene carbonate or diethyl carbonate, is employed, in combination with an electrolyte salt, such as lithium hexafluorophosphate.

On the other hand, with respect to the composition of a liquid electrolyte, a technique for making various kinds of additives to be contained in a liquid electrolyte is proposed, for the purpose of improving cycling characteristics and the like. For example, in Patent Literature 1, improvement in the battery performance has been tested, by addition of ethyl cyanoacrylate.

CITATION LIST

Patent Literature

Patent Literature 1: JP-A-2003-086248 ("JP-A" means unexamined published Japanese patent application)

SUMMARY OF THE INVENTION

Problems that the Invention is to Solve

In the meantime, requirement for the lithium secondary battery is heading to higher and higher levels of performance and multi-functionalization, including enlargement of the lithium secondary battery to automotive application. In particular, there is a tendency for the charge/discharge and storage of the secondary battery to be carried out in a variety of temperature range, and as a result realization of high performance even under such environment has been desired. The present inventor, therefore, focused attention on a maintenance property of the battery capacity at the time when high-temperature storage is carried out at the full charge state and high-rate discharge characteristics after the high-temperature storage. In general, an effort for improvement to those problems is not yet sufficient.

The present invention has been made in view of the foregoing points and it is a purpose of the present invention to provide: a secondary battery, which exhibits little degradation of capacity and which provides excellent high-rate discharge characteristics, in spite of storage of the secondary battery at a high temperature; and a non-aqueous liquid electrolyte for a secondary battery, which is used in the foregoing secondary battery.

Means to Solve the Problem

The above-described problems of the present invention were solved by the following means.

[1] A non-aqueous liquid electrolyte for a secondary battery, containing an electrolyte and a compound (A) represented by any one of formulae (I-1) to (I-3) in an organic solvent:

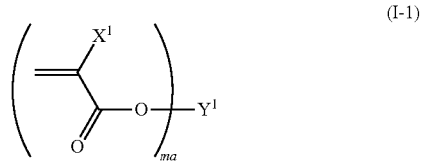

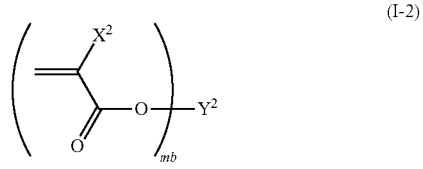

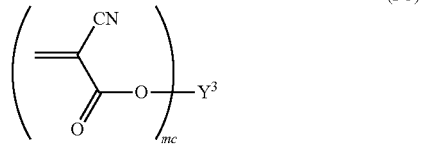

wherein, in formula (I-1), $X^1$ represents an alkyl group substituted with a halogen atom; $Y^1$ represents a hydrogen atom or an organic group; and ma represents an integer from 1 to 6;

wherein, in formula (I-2), $X^2$ represents a group having an oxygen atom; $Y^2$ represents a hydrogen atom or an organic group; and mb represents an integer from 1 to 6; and wherein, in formula (I-3), $Y^3$ represents an organic group having 4 or more carbon atoms, or an organic group having an oxygen atom or a nitrogen atom; and mc represents an integer from 1 to 6.

[2] The non-aqueous liquid electrolyte for a secondary battery as described in the item [1], further containing a compound (B) releasing, upon oxidation or reduction, an active species that reacts with the compound (A) represented by any one of formulae (I-1) to (I-3).

[3] The non-aqueous liquid electrolyte for a secondary battery as described in the item [1] or [2], wherein a content of the compound (A) is from 0.001 to 10 mass % with respect to the total amount of the liquid electrolyte.

[4] The non-aqueous liquid electrolyte for a secondary battery as described in item [2] or [3], wherein the content of the compound (B) is from 0.0001 to 10 mass % with respect to the total amount of the liquid electrolyte.

[5] The non-aqueous liquid electrolyte for a secondary battery described in any one of the items [2] to [4], wherein an addition amount ratio (A/B) of the compound (A) to the compound (B) is from 100/1 to 1/10.

[6] The non-aqueous liquid electrolyte for a secondary battery described in any one of the items [1] to [5], wherein $X^1$ is an alkyl group substituted with a fluorine atom.

[7] The non-aqueous liquid electrolyte for a secondary battery described in any one of the items [1] to [5], wherein $X^2$ is an alkoxy group, an alkoxymethyl group, an acyloxy group, or an acyloxymethyl group.

[8] The non-aqueous liquid electrolyte for a secondary battery described in any one of the items [1] to [7], wherein $Y^1$, $Y^2$ and $Y^3$ each independently represent a divalent or multi-valent organic group, or a univalent organic group having at least one of an oxygen atom, a nitrogen atom, or a fluorine atom.

[9] The non-aqueous liquid electrolyte for a secondary battery described in any one of the items [2] to [8], wherein the compound (B) is a ketone compound.

[10] The non-aqueous liquid electrolyte for a secondary battery described in the item [9], wherein the ketone compound is an aromatic ketone compound.

[11] The non-aqueous liquid electrolyte for a secondary battery described in the item [10], wherein the aromatic ketone compound contains at least one compound selected from the group consisting of acetophenone compounds, benzophenone compounds, 9-fluorenone compounds, anthrone compounds, xanthone compounds, dibenzosuberone compounds, dibenzosuberenone compounds, anthraquinone compounds, bianthronyl compounds, bianthrone compounds, and dibenzoyl compounds.

[12] A non-aqueous liquid electrolyte secondary battery, containing:
a positive electrode;
a negative electrode; and
the non-aqueous liquid electrolyte for a secondary battery described in any one of the items [1] to [11].

[13] The non-aqueous liquid electrolyte secondary battery described in the item [12], wherein a compound having at least one of nickel, cobalt, or manganese is used as an active material of the positive electrode.

[14] The non-aqueous liquid electrolyte secondary battery described in the items [12] or [13], wherein lithium titanate (LTO) or a carbon material is used as a negative electrode active substance.

[15] A kit of a non-aqueous liquid electrolyte for a secondary battery, wherein a chemical agent containing a compound represented by any one of formulae (I-1) to (I-3) is combined with a chemical agent containing an electrolyte:

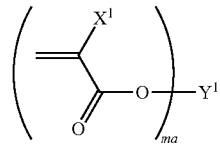

(I-1)

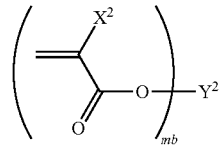

(I-2)

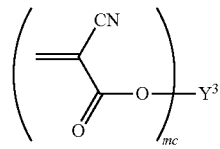

(I-3)

wherein, in formula (I-1), $X^1$ represents an alkyl group substituted with a halogen atom; $Y^1$ represents a hydrogen atom or an organic group; and ma represents an integer from 1 to 6;

wherein, in formula (I-2), $X^2$ represents a group having an oxygen atom; $Y^2$ represents a hydrogen atom or an organic group; and mb represents an integer from 1 to 6; and wherein, in formula (I-3), $Y^3$ represents an organic group having 4 or more carbon atoms, or an organic group having an oxygen atom or a nitrogen atom; and mc represents an integer from 1 to 6.

[16] An additive for a non-aqueous secondary battery liquid electrolyte, comprising a compound represented by any one of formulae (I-1) to (I-3):

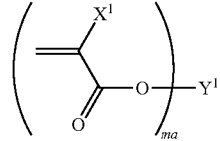

(I-1)

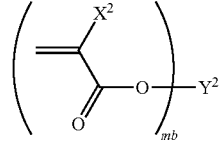

(I-2)

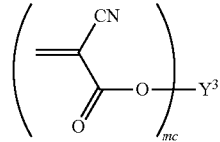

(I-3)

wherein, in formula (I-1), $X^1$ represents an alkyl group substituted with a halogen atom; $Y^1$ represents a hydrogen atom or an organic group; and ma represents an integer from 1 to 6;

wherein, in formula (I-2), $X^2$ represents a group having an oxygen atom; $Y^2$ represents a hydrogen atom or an organic group; and mb represents an integer from 1 to 6; and wherein, in formula (I-3), $Y^3$ represents an organic group having 4 or more carbon atoms, or an organic group having an oxygen atom or a nitrogen atom; and mc represents an integer from 1 to 6.

In the present specification, when there are a plurality of substituents or linking groups marked with specific signs, or when a plurality of substituents and the like (including the number of substituents) are defined at the same time or individually, each of the substituents and the like may be the same as or different from each other. Moreover, when a plurality of substituents and the like come close to each other, they may be bonded or condensed with each other, to form a ring.

Effects of the Invention

A non-aqueous liquid electrolyte and a non-aqueous secondary battery of the present invention exhibit little degradation of capacity and provide excellent high-rate discharge characteristics, despite storage of the non-aqueous liquid electrolyte and the non-aqueous secondary battery at a high temperature.

Other and further features and advantages of the invention will appear more fully from the following description, appropriately referring to the accompanying drawings.

MODE FOR CARRYING OUT THE INVENTION

Figure 1:
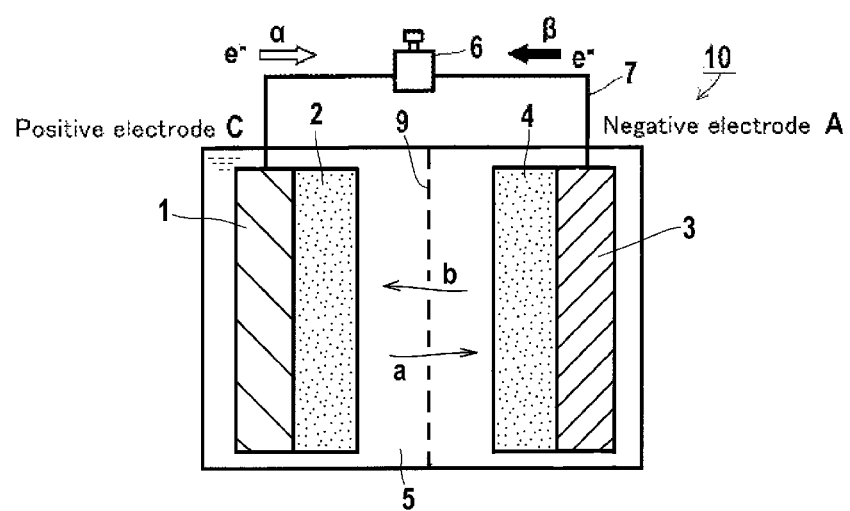
FIG. 1 is a cross-sectional diagram schematically illustrating a mechanism of a lithium secondary battery according to a preferable embodiment of the present invention.

Hereinafter, embodiments of the present invention are described in detail. However, the present invention is not construed by being limited thereto.

[Non-Aqueous Liquid Electrolyte for a Secondary Battery]
(Compound (A))

The non-aqueous liquid electrolyte of the present invention for a secondary battery contains at least one compound (A) represented by any one of formulas (I-1) to (I-3).

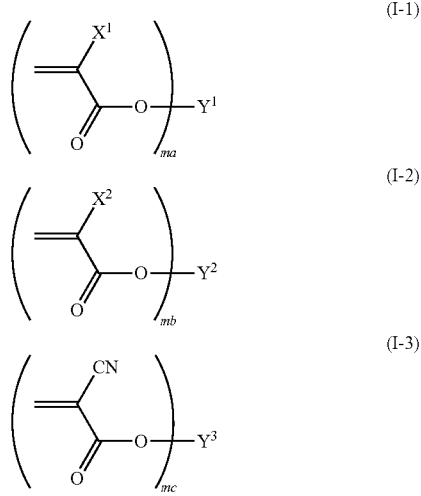

In each of formulae, an individual substituent has the following meaning.

$X^1$ $X^1$ is an alkyl group substituted with a halogen atom, preferably an alkyl group substituted with a fluorine atom, more preferably an alkyl group having 1 to 4 carbon atoms and being substituted with halogen atom (preferably a fluorine atom), and further preferably a trifluoromethyl group.

$X^2$ $X^2$ is a group having an oxygen atom, preferably an alkoxy group (preferably an alkoxy group having 1 to 10 carbon atoms), an alkoxyalkyl group (preferably an alkoxyalkyl group having 2 to 10 carbon atoms, more preferably an alkoxymethyl group having 2 to 10 carbon atoms), an acyloxy group (preferably an acyloxy group having 2 to 10 carbon atoms), or an acyloxyalkyl group (preferably an acyloxyalkyl group having 3 to 11 carbon atoms, more preferably an acyloxymethyl group having 3 to 11 carbon atoms).

Ma, Mb and Mc ma, mb and mc each represent an integer from 1 to 6, more preferably an integer from 1 to 4, and further preferably 1 or 2.

$Y^1$ and $Y^2$ $Y^1$ and $Y^2$ each independently are a hydrogen atom or an organic group. The organic group is preferably an organic group having 3 or more carbon atoms. Such an organic group has a structure which takes a ma- or mb-valent or multi-valent substituent, and the organic group is preferably a ma- or mb-valent group. This is applicable to a relationship between $Y^3$ described below and mc as well.

In particular, $Y^1$ and $Y^2$ are preferably a divalent or multi-valent organic group, or a univalent organic group having at least one of an oxygen atom, a nitrogen atom, or a fluorine atom.

The univalent organic group preferably includes a chain or cyclic hydrocarbon group (preferably 1 to 20 total carbon atoms) which may have a halogenated alkyl group (preferably 1 to 6 carbon atoms) or a cyano group. Alternatively, a preferable univalent organic group includes univalent organic groups (preferably 2 to 10 total carbon atoms) having a group having a chain or cyclic carbonate group (preferably 2 to 4 carbon atoms), a group having a chain or cyclic ether group (preferably 3 to 6 carbon atoms), a group having a chain or cyclic ester group (preferably 3 to 6 carbon atoms), a group having a chain or cyclic amide group (preferably 3 to 6 carbon atoms), or a group having a chain or cyclic carbamate group (preferably 3 to 6 carbon atoms). More preferable univalent organic group is groups (preferably 1 to 20 carbon atoms) having a carbonate group, an ether group, an ester group, a lactone group, an amide group, a carbamate group, a nitrile group, or a combination thereof.

The divalent or multi-valent organic group is preferably a di- to tetra-valent linking group (preferably 1 to 20 carbon atoms) composed of a chain hydrocarbon group, an aromatic group, or a combination thereof. The hydrocarbon group may contain a linking group having an oxygen atom and/or a nitrogen atom in the chain thereof. When an oxygen atom or a nitrogen atom is contained in $Y^1$ or $Y^2$, the number of each of these atoms is not particularly limited, but preferably 1 to 10. The divalent or multi-valent linking group preferably includes an alkylene group (preferably 2 to 12 carbon atoms, specifically ethylene, propylene, butylene, hexylene, neopentylene, octylene groups), a polyoxyalkylene group (preferably having 2 to 20 oxyalkylene structures, specifically polyoxyethylene, polyoxypropylene groups), an arylene group (specifically o-, m-, p-phenylene, 2,2'-biphenylene, 4,4'-biphenylene groups), and an aralkylene group (specifically o-, m-, p-xylylene, 4,4'-biphenylmethylene groups).

$Y^1$ and $Y^2$ each are preferably a structure represented by any one of formulas (Ex-1) to (Ex-5).

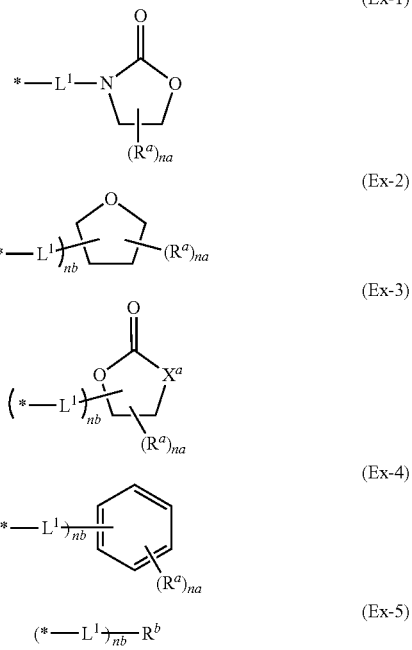

$L^1$

In formulas (Ex-1) to (Ex-5), $L^1$ is a single bond or a linking group. The linking group is preferably an alkylene group which may have a substituent T (preferably an alkylene group having 1 to 6 carbon atoms). In formula Ex-3, $L^1$ may be a linking group which extends from $X^a$.

$R^a$ $R^a$ represents an arbitrary substituent (for example, a substituent T described below), and preferred are an alkyl group (preferably 1 to 6 carbon atoms), a halogen atom (preferably a fluorine atom), and a fluorinated alkyl group (preferably 1 to 6 carbon atoms).

$X^a$ $X^a$ represents an oxygen atom or a methylene group ($-CR_2-$). Herein, examples of R include a hydrogen atom and those exemplified as the substituent T described below. When R is a substituent, R is preferably an alkyl group.

Na na is an integer from 0 to 2.

Nb nb represents the number which is determined correspondingly to ma, mb and mc in formulae (I-1) to (I-3). nb is preferably an integer from 1 to 3.

$R^b$

In formulas, $R^b$ represents a univalent or divalent or multi-valent (preferably univalent to hexa-valent, more preferably univalent to tetra-valent, and still more preferably univalent or divalent) organic group, and includes a chain or cyclic hydrocarbon group (preferably 1 to 20 total carbon atoms) which may have a halogenated alkyl group (preferably 1 to 6 carbon atoms) or a cyano group. At that time, an oxygen atom (preferably 1 to 100 atoms), an ester linking group ($-COO-$) (preferably 1 to 10 groups), or a carbonate linking group ($-OCOO-$) (preferably 1 to 10 groups) may be present in the chain of the hydrocarbon group. Further, $R^b$ may have a branched structure in the middle of the group, and a structure having $L^1$ at the end thereof may be present.

$Y^3$ $Y^3$ is an organic group having 4 or more carbon atoms, or an organic group having an oxygen atom or a nitrogen atom Examples of the organic group having 4 or more carbon atoms include a hydrocarbon group having 4 to 20 carbon atoms (preferably a linear hydrocarbon group). This hydrocarbon group may have a substituent. Examples of the substituent include a halogen atom, a halogenated alkyl group (preferably having 1 to 6 carbon atoms), and a cyano group.

With respect to the organic group having an oxygen atom or a nitrogen atom, the univalent organic group is preferably univalent organic groups (preferably 2 to 10 total carbon atoms) having a group having a chain or cyclic carbonate group (preferably 2 to 4 carbon atoms), a group having a chain or cyclic ether group (preferably 3 to 6 carbon atoms), a group having a chain or cyclic ester group (preferably 3 to 6 carbon atoms), a group having a chain or cyclic amide group (preferably 3 to 6 carbon atoms), or a group having a chain or cyclic carbamate group (preferably 3 to 6 carbon atoms). More preferable univalent organic group is groups (preferably 1 to 20 carbon atoms) having a carbonate group, an ether group, an ester group, a lactone group, an amide group, a carbamate group, a nitrile group, or a combination thereof.

As for the divalent or multi-valent linking group, preferred are divalent to tetra-valent linking groups derived from a hydrocarbon group having 4 or more carbon atoms (preferably 4 to 20 carbon atoms), an aromatic group (preferably 6 to 24 carbon atoms), or a combination thereof. The hydrocarbon group may contain a linking group having an oxygen atom and/or a nitrogen atom in a chain thereof. When the oxygen atom or the nitrogen atom is contained in $Y^3$, the number of each of these atoms is not particularly limited, but preferably from 1 to 10.

$Y^3$ is preferably a structure represented by any one of formulas (Ex-1) to (Ex-5). However, in formulas (Ex-5), $R^b$ is read so as to replace it with the following $R^{b'}$.

$R^{b'}$

In formulas, $R^{b'}$ represents a univalent or divalent or multi-valent organic group, and includes a chain or cyclic hydrocarbon group (preferably 4 to 20 carbon atoms) which may have a halogenated alkyl group (preferably 1 to 6 carbon atoms) or a cyano group. At that time, an oxygen atom (preferably 1 to 100 atoms), an ester linking group ($-COO-$) (preferably 1 to 10 groups), or a carbonate linking group ($-OCOO-$) (preferably 1 to 10 groups) may be present in the chain of the hydrocarbon group. Further, $R^{b'}$ may have a branched structure in the middle of the group, and a structure having $L^1$ at the end thereof may be present.

Hereinafter, specific examples of the compound represented by formula (I-1) will be described, but the present invention is not limited to these.

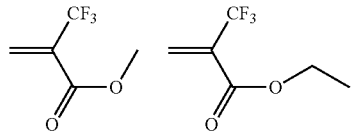

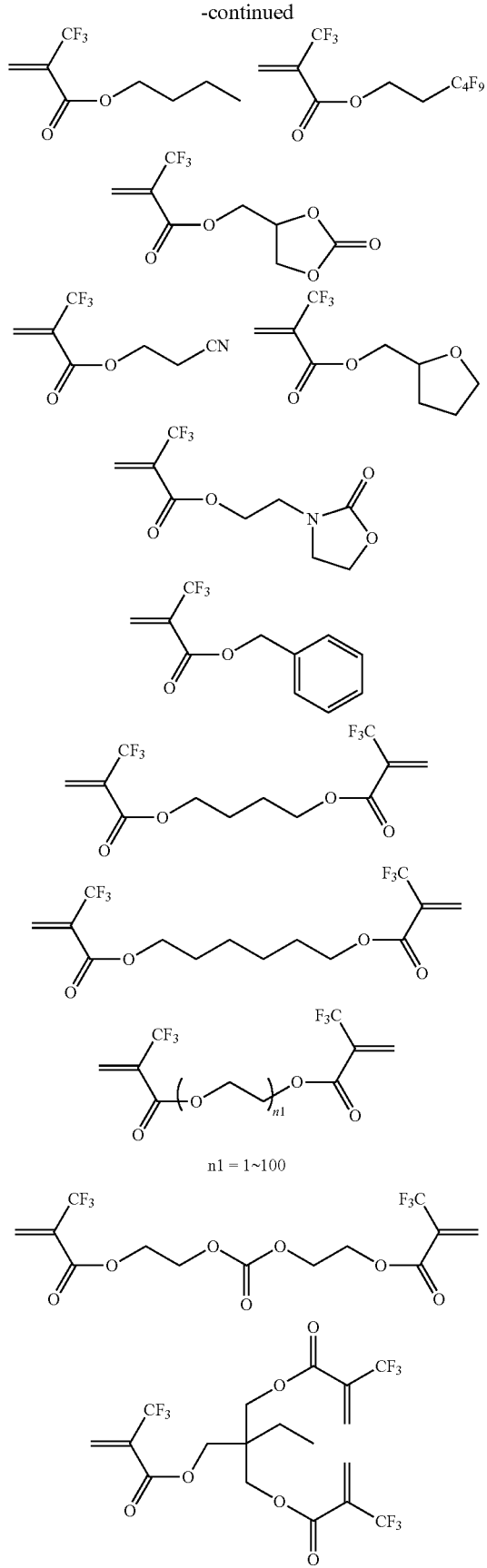
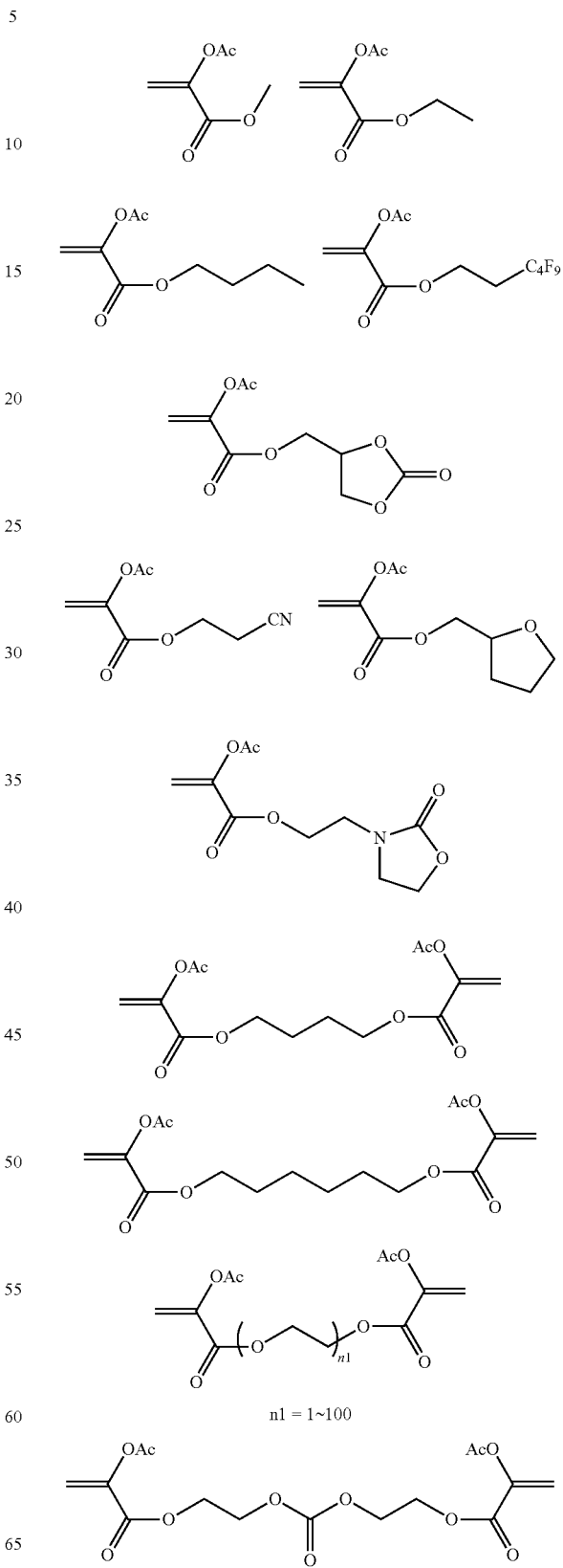
Hereinafter, specific examples of the compound represented by formula (I-2) will be described, but the present invention is not limited to these.

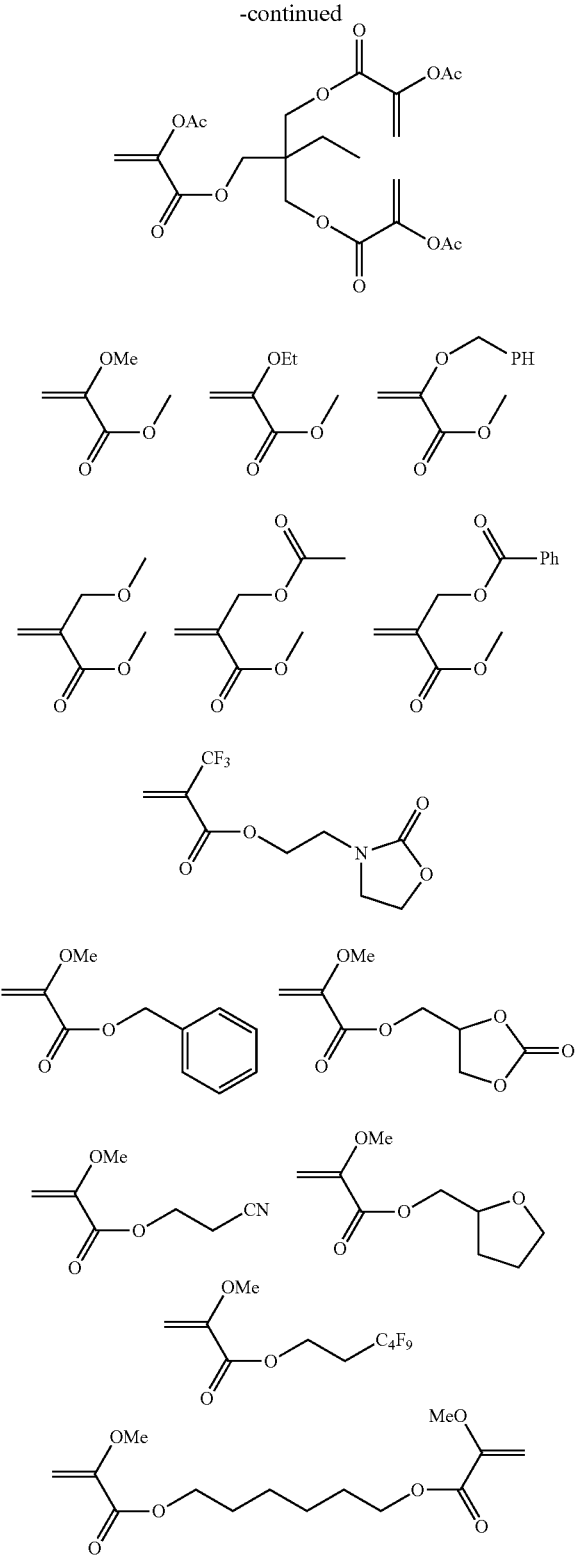

Me: methyl group
Ac: acetyl group
Ph: phenyl group

Hereinafter, specific examples of the compound represented by formula (I-3) will be described, but the present invention is not limited to these.

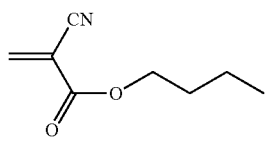
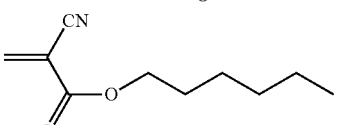
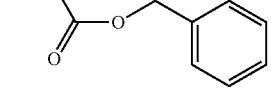
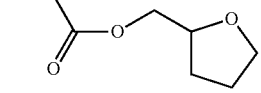
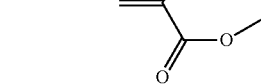
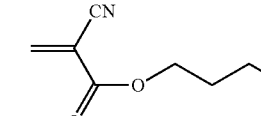
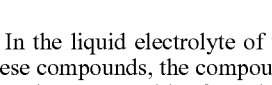
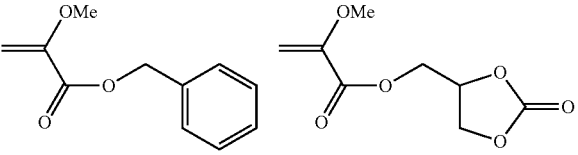
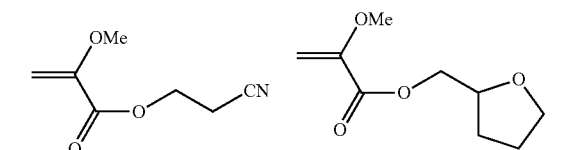

In the liquid electrolyte of the present invention, among these compounds, the compound (A) is preferably the compound represented by formula (I-1).

The addition amount of the compound (A) represented by any of formulae (I-1) to (I-3) is preferably 0.001 mass % or greater, more preferably 0.003 mass % or greater, and still more preferably 0.005 mass % or greater, with respect to the entire liquid electrolyte. The upper limit thereof is preferably 10 mass % or less, more preferably 1 mass % or less, and particularly preferably 0.5 mass % or less. By controlling the addition amount to the above-described range, a desired high-temperature capacity maintenance property and high-rate characteristics can be achieved at a high level, while maintaining a good discharge performance, which is preferable.

(Compound (B))

The non-aqueous liquid electrolyte for a secondary battery of the present invention preferably contains a compound (B) which releases, upon oxidation or reduction, an active species that reacts with the compound (A) represented by any one of formulae (I-1) to (I-3). The compound (A) works more efficiently due to this material, so that occurrence of irreversible capacity is suppressed by a small amount thereof and the battery performance is improved. As for the active species that the compound (B) releases upon oxidation or reduction, a radical, an anion or a cation is preferable, and a radical and/or an anion are/is more preferable. In particular, preferred is a compound which produces an anion radical when the compound is reduced at the anode, or a compound which produces an anion radical when the compound is reduced at the anode, and further produces an anion and/or radical upon decomposition thereof.

Examples of the compound are preferably a ketone compound, an oxime ester compound, an oxime ether compound, a sulfonium salt, and an iodinium salt. An aromatic ketone compound is more preferable. Further more preferred are an acetophenone compound, a benzophenone compound, a 9-fluorenone compound, an anthrone compound, a xanthone compound, a dibenzosuberone compound, a dibenzosuberenone compound, an anthraquinone compound, a bianthronyl compound, a bianthrone compound, and a dibenzoyl compound. These compounds may have a substituent. Preferred examples of the substituent include an alkyl group, an alkoxy group, an acyl group, an acyloxy group, a cyano group, an alkoxycarbonyl group, a halogen atom, an aryl group, and an aralkyl group.

The addition amount of the compound (B) is preferably 0.0001 mass % or greater, more preferably 0.0005 mass % or greater, and still more preferably 0.001 mass % or greater, with respect to the entire liquid electrolyte. The upper limit thereof is preferably 10 mass % or less, more preferably 1 mass % or less, and particularly preferably 0.1 mass % or less.

The addition amount ratio (A/B) of the compound (A) to the compound (B) is preferably 100/1 or less, and more preferably 50/1 or less, in terms of mass ratio. The lower limit thereof is preferably 1/10 or greater, more preferably 1/1 or greater, and particularly preferably 5/1 or greater.

It is noted that in the present specification, the representation of the compound (for example, when the name of a chemical is called by putting the term "compound" at the foot of the chemical name) is used in the sense that not only the compound itself, but also its salt, and its ion are incorporated therein. Further, it is used in the sense that the compound means to include a derivative thereof which is modified in a predetermined part in the range of achieving a desired effect.

In the present specification, a substituent (a linking group is also the same) that is not specified by substitution or non-substitution means that the substituent may have an optional substituent. This is applied to the compound that is not specified by substitution or non-substitution. Preferable examples of the substituent include the substituent T described below.

Examples of the substituent T include: an alkyl group (preferably an alkyl group having 1 to 20 carbon atoms, e.g. methyl, ethyl, isopropyl, t-butyl, pentyl, heptyl, 1-ethylpentyl, benzyl, 2-ethoxyethyl, or 1-carboxymethyl), an alkenyl group (preferably an alkenyl group having 2 to 20 carbon atoms, e.g. vinyl, allyl, or oleyl), an alkynyl group (preferably an alkynyl group having 2 to 20 carbon atoms, e.g. ethynyl, butadiynyl, or phenylethynyl), a cycloalkyl group (preferably a cycloalkyl group having 3 to 20 carbon atoms, e.g. cyclopropyl, cyclopentyl, cyclohexyl, or 4-methylcyclohexyl), an aryl group (preferably an aryl group having 6 to 26 carbon atoms, e.g. phenyl, 1-naphthyl, 4-methoxyphenyl, 2-chlorophenyl, or 3-methylphenyl), a heterocyclic group (preferably a heterocyclic group having 2 to 20 carbon atoms, more preferably a 5- or 6-membered heterocyclic group having at least one oxygen atom, sulfur atom or nitrogen atom, e.g. 2-pyridyl, 4-pyridyl, 2-imidazolyl, 2-benzimidazolyl, 2-thiazolyl, or 2-oxazolyl), an alkoxy group (preferably an alkoxy group having 1 to 20 carbon atoms, e.g. methoxy, ethoxy, isopropyloxy, or benzyloxy), an aryloxy group (preferably an aryloxy group having 6 to 26 carbon atoms, e.g. phenoxy, 1-naphthyloxy, 3-methylphenoxy, or 4-methoxyphenoxy), an alkoxycarbonyl group (preferably an alkoxycarbonyl group having 2 to 20 carbon atoms, e.g. ethoxycarbonyl, or 2-ethylhexyloxycarbonyl), an amino group (preferably an amino group, an alkylamino group and an arylamino group each having 0 to 20 carbon atoms, e.g. amino, N,N-dimethylamino, N,N-diethylamino, N-ethylamino, or anilino), a sulfamoyl group (preferably a sulfonamide group having 0 to 20 carbon atoms, e.g. N,N-dimethylsulfamoyl, or N-phenylsulfamoyl), an acyl group (preferably an acyl group having 1 to 20 carbon atoms, e.g. acetyl, propionyl, butyryl, or benzoyl), an acyloxy group (preferably an acyloxy group having 1 to 20 carbon atoms, e.g. acetyloxy, or benzoyloxy), a carbamoyl group (preferably a carbamoyl group having 1 to 20 carbon atoms, e.g. N,N-dimethylcarbamoyl, or N-phenylcarbamoyl), an acylamino group (preferably an acylamino group having 1 to 20 carbon atoms, e.g. acetylamino, or benzoylamino), a sulfonamide group (preferably a sulfamoyl group having 0 to 20 carbon atoms, e.g. methane sulfonamide, benzene sulfonamide, N-methyl methane sulfonamide, or N-ethyl benzene sulfonamide), an alkylthio group (preferably an alkylthio group having 1 to 20 carbon atoms, e.g. methylthio, ethylthio, isopropylthio, or benzylthio), an arylthio group (preferably an arylthio group having 6 to 26 carbon atoms, e.g. phenylthio, 1-naphthylthio, 3-methylphenylthio, or 4-methoxyphenylthio), an alkyl- or aryl-sulfonyl group (preferably an alkyl- or aryl-sulfonyl group having 1 to 20 carbon atoms, e.g. methylsulfonyl, ethylsulfonyl, or benzene sulfonyl), a hydroxyl group, a cyano group, and a halogen atom (e.g. a fluorine atom, a chlorine atom, a bromine atom, or an iodine atom). Among these, an alkyl group, an alkenyl group, an aryl group, a heterocyclic group, an alkoxy group, an aryloxy group, an alkoxycarbonyl group, an amino group, an acylamino group, a hydroxyl group and a halogen atom are more preferable; and an alkyl group, an alkenyl group, a heterocyclic group, an alkoxy group, an alkoxycarbonyl group, an amino group, an acylamino group and a hydroxyl group are particularly preferable.

Further, the group mentioned as the examples of the substituent T may be substituted by any of substituent T.

When a compound, a substituent, a linking group or the like contains an alkyl group, an alkylene group, an alkenyl group, an alkenylene group or the like, these groups may be a cyclic group or a chain group, may be linear or branched, and may be substituted or unsubstituted as described above. Furthermore, when the compound, the substituent, the linking group or the like contains an aryl group, a heterocyclic group or the like, they may be monocyclic or fused-cyclic, and may be substituted or unsubstituted as described above.

(Organic Solvent)

Examples the organic solvent that can be used in the present invention include cyclic carbonates, such as ethylene carbonate, propylene carbonate, and butylene carbonate; linear carbonates, such as dimethyl carbonate, diethyl carbonate, ethyl methyl carbonate, and methyl propyl carbonate; cyclic esters, such as γ-butyrolactone, and γ-valerolactone; linear esters, such as 1,2-dimethoxyethane, and diethylene glycol dimethyl ether; cyclic ethers, such as tetrahydrofuran, 2-methyltetrahydrofuran, tetrahydropyran, 1,3-dioxolane, 4-methyl-1,3-dioxolane, 1,3-dioxane, and 1,4-dioxane; linear esters, such as methyl acetate, ethyl acetate, methyl propionate, ethyl propionate, methyl butyrate, methyl isobutyrate, methyl trimethylacetate, and ethyl trimethylacetate; nitrile compounds, such as acetonitrile, glutaronitrile, adiponitrile, methoxyacetonitrile, and 3-methoxypropionitrile; N,N-dimethylformamide, N-methylpyrrolidinone, N-methyl oxazolidinone, N,N'-dimethylimidazolidinone, nitromethane, nitroethane, sulfolane, trimethyl phosphate, dimethyl sulfoxide, dimethyl sulfoxide, and phosphate. These may be used alone or in combination of two or more. Of these, at least one selected from the group consisting of cyclic carbonates (preferably ethylene carbonate, and propylene carbonate), linear carbonates (preferably dimethyl carbonate, diethyl carbonate, and ethyl methyl carbonate), and cyclic esters (preferably γ-butyrolactone) is preferred; and a solvent containing a cyclic carbonate and a linear carbonate, and a solvent containing a cyclic carbonate and a cyclic ester are more preferred. In particular, a combination of a high-viscosity (high-dielectric constant) solvent (for example, having a relative permittivity ε of 30 or more), such as ethylene carbonate or propylene carbonate, with a low-viscosity solvent (for example, having a viscosity of up to 1 mPa·s), such as dimethyl carbonate, ethyl methyl carbonate, diethyl carbonate, or γ-butyrolactone, is more preferred. This is because the dissociation ability and the ionic mobility of the electrolytic salt are improved.

However, the organic solvent (non-aqueous solvent) used in the present invention is not limited by the foregoing exemplification.

(Electrolyte)

Electrolyte that can be used in the liquid electrolyte of the present invention includes a metal or a salt thereof and a metal ion belonging to Group I or Group II of the Periodic Table or a salt thereof are preferable. The electrolyte is suitably selected depending on the purpose of a liquid electrolyte. For example, lithium salts, potassium salts, sodium salts, calcium salts, and magnesium salts can be mentioned. In a case where the liquid electrolyte is used in a secondary battery or the like, from the viewpoint of the output power of the secondary battery, a lithium salt is preferred. In a case of using the liquid electrolyte of the present invention as the electrolyte of a non-aqueous liquid electrolyte for lithium secondary batteries, it is desirable to select a lithium salt as the salt of the metal ion. The lithium salt is preferably a lithium salt that is usually used in the electrolyte of a non-aqueous liquid electrolyte for lithium secondary batteries, but for example, the salts described below are preferred.

(L-1) Inorganic lithium salt: inorganic fluoride salt, such as $LiPF_6$, $LiBF_4$, $LiAsF_6$, $LiSbF_6$; perhalogenic acid salts, such as $LiClO_4$, $LiBrO_4$, $LiIO_4$; and inorganic chloride, salt, such as $LiAlCl_4$, and the like.

(L-2) Organic lithium salt containing fluorine: perfluoroalkanesulfonic acid salt, such as $LiCF_3SO_3$; perfluoroalkanesulfonylimide salts, such as $LiN(CF_3SO_2)_2$, $LiN(CF_3CF_2SO_2)_2$, $LiN(FSO_2)_2$, and $LiN(CF_3SO_2)(C_4F_9SO_2)$; perfluoroalkanesulfonylmethide salts, such as $LiC(CF_3SO_2)_3$; fluoroalkyl fluorophosphoric acid salts, such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$, and the like.

(L-3) Oxalatoborate salts: lithium bis(oxalate)borate, lithium difluoro(oxalate)borate, and the like.

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)_2$, are preferred; and lithium imide salts, such as $LiPF_6$, $LiBF_4$, $LiN(Rf^1SO_2)_2$, $LiN(FSO_2)_2$ and $LiN(Rf^1SO_2)(Rf^2SO_2)_2$ are more preferred. Herein, Re and Re each represent a perfluoroalkyl group.

Meanwhile, as for the lithium salt that is used in the liquid electrolyte, one kind may be used alone, or any two or more kinds may be used in combination.

The ion of the metal belonging to Group I or Group II of the Periodic Table or the salt thereof in the liquid electrolyte is added to the liquid electrolyte in such an amount that the electrolyte is contained at a preferred salt concentration to be mentioned in the method for preparing the liquid electrolyte below. The salt concentration is selected according to the intended purpose of the liquid electrolyte, but the content is usually from 10 mass % to 50 mass %, and more preferably from 15 mass % to 30 mass %, relative to the total mass of the liquid electrolyte. When evaluated as the ionic concentration, the salt concentration need only be calculated in terms of the salt with a favorably applied metal.

(Other Components)

In the liquid electrolyte of the present invention, various additives can be used in accordance with the purpose, in order to enhance the performance, safety and durability of the battery, to the extent that the effect of the present invention is not impaired. As for such additives, functional additives, such as an overcharge preventing agent, a negative electrode film forming agent, a positive electrode protective agent, and a flame retardant, may be used.

Specifically, the additives include: carbonate compounds, such as vinylene carbonate, vinylethylene carbonate, fluoroethylene carbonate, and difluoroethylene carbonate; sulfur-containing compounds, such as ethylene sulfite, propane sulfite, and sulfonic acid esters; aromatic compounds, such as biphenyl, cyclohexyl benzene, and t-amyl benzene; and phosphorus compounds, such as phosphoric acid esters. The content ratio of these other additives in the non-aqueous liquid electrolyte is not particularly limited, but is each preferably 0.01 mass % or more, particularly preferably 0.1 mass % or more, and further preferably 0.2 mass % or more, with respect to the whole organic components of the non-aqueous liquid electrolyte. The upper limit of the content ratio is preferably 5 mass %, particularly preferably 3 mass %, and further preferably 2 mass %. The addition of these compounds allows rupture and ignition of a battery to be restrained during disorder due to overcharge, and allows capacity maintenance characteristics and cycling characteristics to be improved after preserving at high temperature.

[Method of Preparing Liquid Electrolyte and the Like]

The non-aqueous liquid electrolyte for a secondary battery of the present invention is prepared by a usual method in such a manner that the above-mentioned each component is dissolved in the non-aqueous liquid electrolyte solvent including an example using a lithium salt as a salt of the metal ion.

The term "non-aqueous" as used in the present invention means that water is substantially not contained, and a small amount of water may be contained as long as the effects of the present invention are not impaired. In consideration of obtaining good properties, water is preferably contained in an amount of up to 200 ppm and more preferably up to 100 ppm. Although the lower limit is not particularly restricted, it is practical for the water content to be 10 ppm or more in consideration of inevitable incorporation. Although the viscosity of the liquid electrolyte of the present invention is not particularly limited, the viscosity at 25° C. is preferably 10 to 0.1 mPa·s, more preferably 5 to 0.5 mPa·s.

[Secondary Battery]

In the present invention, a non-aqueous secondary battery preferably contains the above-mentioned non-aqueous liquid electrolyte. A preferable embodiment is described while referring to FIG. 1 schematically illustrating a mechanism of a lithium ion secondary battery. The lithium ion secondary battery 10 of the present embodiment includes the above-described non-aqueous liquid electrolyte 5 for a secondary battery of the present invention, a positive electrode C (a positive electrode current collector 1, a positive electrode active material layer 2) capable of insertion and release of lithium ions, and a negative electrode A (a negative electrode current collector 3, a negative electrode active material layer 4) capable of insertion and discharge, or dissolution and precipitation, of lithium ions. In addition to these essential members, the lithium secondary battery may also be constructed to include a separator 9 that is disposed between the positive electrode and the negative electrode, a current collector terminals (not shown), and an external case (not shown), in consideration of the purpose of using the battery, the form of the electric potential, and the like. According to the necessity, a protective element may also be mounted in at least any one side of the interior of the battery and the exterior of the battery. By employing such a structure, transfer of lithium ions a and b occurs in the liquid electrolyte 5, and charging α and discharging β can be carried out. Thus, operation and accumulation can be carried out by means of an operating means 6 through the circuit wiring 7. The configuration of the lithium secondary battery, which is a preferable embodiment of the present invention, will be described in detail below.

(Battery Shape)

There are no particular limitations on the battery shape that is applied to the lithium secondary battery of the present embodiment, and examples of the shape include a bottomed cylindrical shape, a bottomed rectangular shape, a thin flat shape, a sheet shape, and a paper shape. The lithium secondary battery of the present embodiment may have any of these shapes. Furthermore, an atypical shape, such as a horseshoe shape or a comb shape, which is designed in consideration of the form of the system or device into which the lithium secondary battery is incorporated, may also be used. Among them, from the viewpoint of efficiently releasing the heat inside of the battery to the outside thereof, a rectangular shape, such as a bottomed rectangular shape or a thin flat shape, which has at least one relatively flat and large-sized surface, is preferred.

Figure 2:
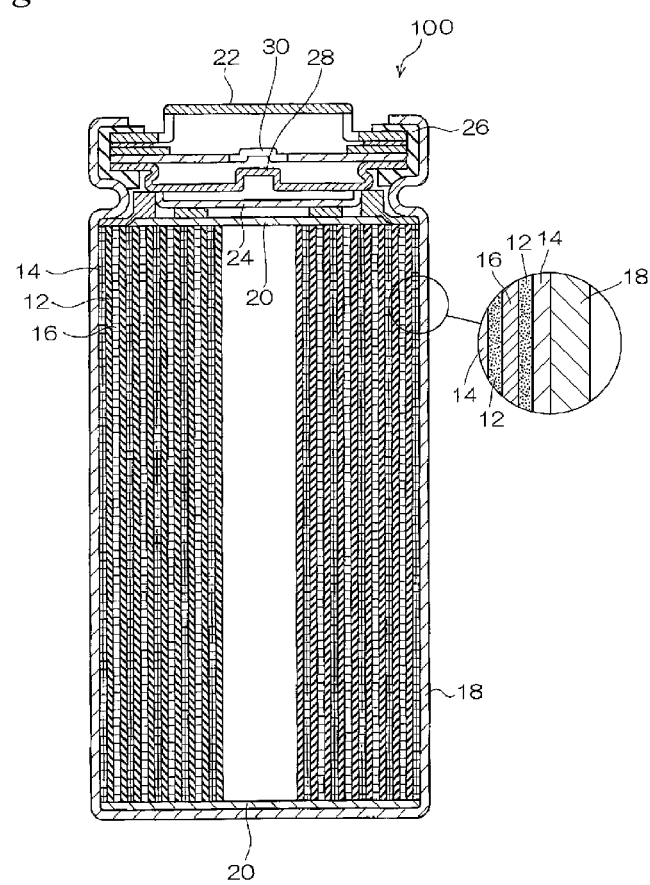
FIG. 2 is a cross-sectional diagram schematically illustrating a specific configuration of a lithium secondary battery according to a preferable embodiment of the present invention.

In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to decrease the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18.

With regard to the bottomed rectangular shape, it is preferable that the value of the ratio of twice the area of the largest surface, S (the product of the width and the height of the external dimension excluding terminal areas, unit: $cm^2$) and the external thickness of the battery, T (unit: cm), 2S/T, be 100 or greater, and more favorably 200 or greater. By having the largest surface made large, even in the case of batteries of high output power and large capacity, characteristics, such as cycle characteristics and high temperature storage, can be enhanced, and also, the heat dissipation efficiency at the time of abnormal heat generation can be increased. Thus, it is advantageous from the viewpoint that "valve action" or "bursting", which will be described below, can be prevented.

(Battery-Constituting Members)

The lithium secondary battery of the present embodiment is constituted to include the liquid electrolyte 5, electrode mixtures of a positive electrode C and a negative electrode A, and a basic member of the separator 9, based on FIG. 1. These various members will be described below. The non-aqueous liquid electrolyte secondary battery of the present invention includes at least the non-aqueous liquid electrolyte for batteries of the present invention as the liquid electrolyte.

(Electrode Mixtures)

An electrode mixture is a composite obtained by applying an active substance, and a dispersion of an electroconductive agent, a binder, a filler and the like on a current collector (electrode substrate). For a lithium battery, a positive electrode mixture in which the active substance is a positive electrode active substance, and a negative electrode mixture in which the active substance is a negative electrode active substance are preferably used. Next, each component in dispersions composing the electrode mixture (composition for electrode) is described.

Positive Electrode Active Substance

As a positive electrode active substance, a particulate positive electrode active substance may be used. Specifically, although as the positive electrode active substance, a transition metal oxide which is capable of reversible insertion and release of lithium ions can be used, it is preferable to use a lithium-containing transition metal oxide. Suitable examples of the lithium-containing transition metal oxide that is preferably used as a positive electrode active substance, include oxides containing one or more of lithium-containing Ti, lithium-containing V, lithium-containing Cr, lithium-containing Mn, lithium-containing Fe, lithium-containing Co, lithium-containing Ni, lithium-containing Cu, lithium-containing Mo, and lithium-containing W. Furthermore, alkali metals other than lithium (elements of Group 1 (Ia) and Group 2 (IIa) of the Periodic Table of Elements), and/or Al, Ga, In, Ge, Sn, Pb, Sb, Bi, Si, P, B and the like may also be incorporated. The amount of incorporation is preferably from 0 mol % to 30 mol % relative to the amount of the transition metal.

Among the lithium-containing transition metal oxides that are preferably used as the positive electrode active substance, a substance synthesized by mixing a lithium compound and a transition metal compound (herein, the transition metal refers to at least one selected from Ti, V, Cr, Mn, Fe, Co, Ni, Mo, and W) such that the total molar ratio of lithium compound/transition metal compound is 0.3 to 2.2.

Furthermore, among the lithium compound/transition metal compound, materials containing $Li_gM3O_2$ (wherein M3 represents one or more elements selected from Co, Ni, Fe, and Mn; and g represents 0 to 1.2), or materials having a spinel structure represented by $Li_hM4_2O$ (wherein M4 represents Mn; and h represents 0 to 2) are particularly preferred. As M3 and M4 described above, Al, Ga, In, Ge, Sn, Pb, Sb, Bi, Si, P, B, or the like may also be incorporated, in addition to the transition metal. The amount of incorporation is preferably from 0 mol % to 30 mol % relative to the amount of the transition metal.

Among the materials containing $Li_gM3O_2$ and the materials having a spinel structure represented by $Li_hM4_2O_4$, $Li_gCoO_2$, $Li_gNiO_2$, $Li_gMnO_2$, $Li_gCo_jNi_{1-j}O_2$, $Li_hMn_2O_4$, $LiNi_jMn_{1-j}O_2$, $LiCo_jNi_hAl_{1-j-h}O_2$, $LiCo_jNi_hMn_{1-j-h}O_2$, $LiMn_hAl_{2-h}O_4$, and $LiMn_hNi_{2-h}O_4$ (wherein in the respective formulas, g represents 0.02 to 1.2; j represents 0.1 to 0.9; and h represents 0 to 2) are particularly preferred; and $Li_gCoO_2$, $LiMn_2O_4$, $LiNi_{0.85}Co_{0.01}Al_{0.05}O_2$, and $LiNi_{0.33}Co_{0.33}Mn_{0.33}O_2$ are most preferred. From the viewpoints of high capacity and high power output, among those described above, an electrode containing Ni is more preferred. Herein, the g value and the h value are values prior to the initiation of charging and discharging, and are values that increase or decrease as charging or discharging occurs. Specific examples thereof include $LiCoO_2$, $LiNi_{0.5}Mn_{0.5}O_2$, $LiNi_{0.85}Co_{0.01}Al_{0.05}O_2$, $LiNi_{0.33}Co_{0.33}Mn_{0.33}O_2$, $LiMn_{1.8}Al_{0.2}O_4$, and $LiMn_{1.5}Ni_{0.5}O_4$.

Preferred examples of the transition metal of the lithium-containing transition metal phosphate compound include V, Ti, Cr, Mn, Fe, Co, Ni, and Cu, and specific examples of the compound include iron phosphates, such as $LiFePO_4$, $Li_3Fe_2(PO_4)_3$, and $LiFeP_2O_7$; cobalt phosphates, such as $LiCoPO_4$; and compounds in which a portion of the transition metal atoms that constitute the main component of these lithium-transition metal phosphate compounds has been substituted by another metal, such as Al, Ti, V, Cr, Mn, Fe, Co, Li, Ni, Cu, Zn, Mg, Ga, Zr, Nb, or Si.

The average particle size of the positive electrode active substance used in the non-aqueous electrolyte secondary battery of the present invention is not particularly limited, but the average particle size is preferably from 0.1 μm to 50 μm. The specific surface area is not particularly limited, but the specific surface area as measured by the BET method is preferably from 0.01 m²/g to 50 m²/g. Furthermore, the pH of the supernatant obtainable when 5 g of the positive electrode active substance is dissolved in 100 mL of distilled water is preferably from 7 to 12.

In order to adjust the positive electrode active substance to a predetermined particle size, a well-known pulverizer or classifier may be used. For example, a mortar, a ball mill, a vibrating ball mill, a vibrating mill, a satellite ball mill, a planetary ball mill, a swirling air flow jet mill, or a sieve is used. The positive electrode active substance obtained according to the calcination method may be used after washing the substance with water, an acidic aqueous solution, an alkaline aqueous solution, or an organic solvent.

In the present invention, a material having a charge range of 4.25V or more is preferably used as a positive electrode active material.

Examples of the positive electrode active material which has the above-described particular charge range include the following materials.

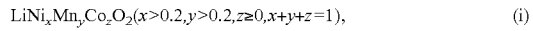  (i)

Representative Examples $LiNi_{1/3}Mn_{1/3}Co_{1/3}O_2$ (also described as $LiNi_{0.33}Mn_{0.33}Co_{0.33}O_2$)

$LiNi_{1/2}Mn_{1/2}O_2$ (also described as $LiNi_{0.5}Mn_{0.5}O_2$)

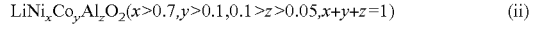  (ii)

Representative Examples $LiNi_{0.8}Co_{0.15}Al_{0.05}O_2$

As for the positive electrode active material which has the above-described particular charge range, the following materials also can be used.

(a) $LiCoMnO_4$
(b) $Li_2FeMn_3O_8$
(c) $Li_2CuMn_3O_8$
(d) $Li_2CrMn_3O_8$
(e) $Li_2NiMn_3O_8$

Further, a solid solution-based positive electrode material (for example, $Li_2MnO_3$—$LiMO_2$ (M: a metal, such as Ni, Co, Mn or the like)) that exhibits a high potential of about 5 V and very high-specific capacitance exceeding 250 mAh/g has been drawing remarkable attention as a positive electrode material for a next generation of lithium-ion battery. It is also preferable that the liquid electrolyte of the present invention is combined with such solid solution-based positive electrode materials.

Negative Electrode Active Substance

There are no particular limitations on the negative electrode active substance, as long as, preferably, the negative electrode active substance is capable of reversible insertion and release of lithium ions, and examples thereof include carbonaceous materials, metal oxides, such as tin oxide and silicon oxide, metal composite oxides, simple lithium substance or lithium alloys, such as a lithium-aluminum alloy, and metals capable of forming an alloy with lithium, such as Sn and Si.

For these materials, one kind may be used alone, or two or more kinds may be used in any combination at any proportions. Among them, carbonaceous materials or lithium composite oxides are preferably used from the viewpoint of safety.

Furthermore, the metal composite oxides are preferably capable of adsorption and release of lithium, but it is preferable for the composite oxides to contain titanium and/or lithium as constituent components, from the viewpoint of high current density charging-discharging characteristics.

A carbonaceous material that is used as a negative electrode active substance is a material which is substantially composed of carbon. Examples thereof include petroleum pitch, natural graphite, artificial graphite, such as vapor-grown graphite, and carbonaceous materials obtained by firing various synthetic resins, such as PAN-based resins and furfuryl alcohol resins. Further, the examples include various carbon fibers, such as PAN-based carbon fibers, cellulose-based carbon fibers, pitch-based carbon fibers, vapor-grown carbon fibers, dehydrated PVA-based carbon fibers, lignin carbon fibers, vitreous carbon fibers, and activated carbon fibers; mesophase microspheres, graphite whiskers, and tabular graphite.

These carbonaceous materials may be classified into hardly graphitized carbon materials and graphite-based carbon materials, according to the degree of graphitization. Also, it is preferable that the carbonaceous materials have the plane spacing, density, and size of crystallites, as described in JP-A-62-22066, JP-A-2-6856, and JP-A-3-45473. The carbonaceous materials are not necessarily single materials, and a mixture of natural graphite and an artificial graphite, as described in JP-A-5-90844, a graphite having a coating layer, as described in JP-A-6-4516, and the like can also be used.

In regard to the metal oxides and metal composite oxides that are negative electrode active substances used in the non-aqueous secondary battery of the present invention, at least one of these is preferably included. The metal oxides and metal composite oxides are particularly preferably amorphous oxides, and furthermore, chalcogenides which are reaction products of metal elements and the elements of Group 16 of the Periodic Table of Elements are also preferably used. The term amorphous as used herein means that the substance has a broad scattering band having an apex at a 2θ value in the range of 20° to 40°, as measured by an X-ray diffraction method using CuKα radiation, and the substance may also have crystalline diffraction lines. The highest intensity obtainable among the crystalline diffraction lines exhibited at a 2θ value in the range from 40° to 70° is preferably 100 times or less, and more preferably 5 times or less, than the diffraction line intensity of the apex of the broad scattering band exhibited at a 2θ value in the range from 20° to 40°, and it is particularly preferable that the substance does not have any crystalline diffraction line.

Among the group of compounds composed of the amorphous oxides and chalcogenides, amorphous oxides and chalcogenides of semi-metallic elements are more preferred, and oxides and chalcogenides formed from one kind alone or combinations of two or more kinds of the elements of Group 13 (IIIB) to Group 15 (VB) of the Periodic Table of Elements, Al, Ga, Si, Sn, Ge, Pb, Sb and Bi are particularly preferred. Specific preferred examples of the amorphous oxides and chalcogenides include, for example, $Ga_2O_3$, $SiO$, $GeO$, $SnO$, $SnO_2$, $PbO$, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, $GeS$, $SnS$, $SnS_2$, $PbS$, $PbS_2$, $Sb_2S_3$, $Sb_2S_5$, and $SnSiS_3$ as for metal compounds. Furthermore, these may also be composite oxides with lithium oxide, for example, $Li_2SnO_2$.

The average particle size of the negative electrode active substance used in the non-aqueous secondary battery of the present invention is preferably from 0.1 μm to 60 μm. In order to adjust the negative electrode active substance to a predetermined particle size, a well-known pulverizer or classifier may be used. For example, a mortar, a ball mill, a sand mill, a vibrating ball mill, a satellite ball mill, a planetary ball mill, a swirling air flow jet mill, and a sieve are favorably used. At the time of pulverization, wet pulverization of using water or an organic solvent, such as methanol, to co-exist with the negative electrode active substance can also be carried out as necessary. In order to obtain a desired particle size, it is preferable to perform classification. There are no particular limitations on the classification method, and a sieve, an air classifier or the like can be used as necessary. Classification may be carried out by using a dry method as well as a wet method.

The chemical formula of the compound obtained by the calcination method can be obtained by using an inductively coupled plasma (ICP) emission spectroscopic method as a measurement method, and computed from the mass difference of the powder measured before and after calcination, as a convenient method.

In the present invention, preferably suitable examples of the negative electrode active substance that can be used together with the amorphous oxide negative electrode active substances represented by Sn, Si and Ge, include carbon materials that are capable of adsorption and release of lithium ions or lithium metal, as well as lithium, lithium alloys, and metal capable of alloying with lithium.

The liquid electrolyte of the present invention exerts excellent characteristics in any of the combination with a high-potential negative electrode (preferably lithium titanium oxide, potential: 1.55V versus Li metal) and the combination with a low-potential negative electrode (preferably carbon material, potential: about 0.1V versus Li metal), each of which is a preferable embodiment of the present invention. Further, the liquid electrolyte of the present invention can be preferably used in a battery having: a negative electrode of a metal or metal oxide which is capable of forming an alloy with lithium and is under development toward enhancement of high-capacity (preferably Si, Si oxide, Si/Si oxide, Sn, Sn oxide, $SnB_xP_yO_z$, Cu/Sn, and a composite body of two or more kinds of these materials); or a negative electrode which is composed of a composite body of such metal or metal oxide with a carbon material.

In the present invention, it is preferable to use lithium titanate, more specifically lithium titanium oxide ($Li[Li_{1/3}Ti_{5/3}]O_4$), as an active material of the negative electrode. By using this as a negative electrode active material, the effects due to the compound represented by any of formulas (I-1) to (I-3) or a combination thereof together with the compound (B) are enhanced further, whereby more excellent battery performances can be exhibited.

Electroconductive Material

As for the electroconductive material, an electron conductive material which does not cause a chemical change in a constructed secondary battery is preferable, and any known electroconductive material can be used. Usually, electroconductive materials, such as natural graphite (scale-like graphite, flaky graphite, earthly graphite, and the like), artificial graphite, carbon black, acetylene black, Ketjen black, carbon fibers, metal powders (copper, nickel, aluminum, silver (described in JP-A-63-148,554), and the like), metal fibers, and polyphenylene derivatives (described in JP-A-59-20,971) can be incorporated alone or as mixtures thereof. Among them, a combination of graphite and acetylene black is particularly preferred. The amount of addition of the electroconductive agent is preferably from 1 mass % to 50 mass %, and more preferably from 2 mass % to 30 mass %. In the case of carbon or graphite, the amount of addition is particularly preferably from 2 mass % to 15 mass %.

Binder

In the present invention, it is preferable that a binder for retaining the electrode mixture described above is used.

Preferred examples of the binder include polysaccharides, thermoplastic resins, and polymers having rubber elasticity, and among them, preferred examples include emulsions (latexes) or suspensions of starch, carboxymethyl cellulose, cellulose, diacetyl cellulose, methyl cellulose, hydroxyethyl cellulose, hydroxypropyl cellulose, sodium alginate; water-soluble polymers, such as poly(acrylic acid), poly(sodium acrylate), polyvinylphenol, poly(vinyl methyl ether), poly(vinyl alcohol), polyvinylpyrrolidone, polyacrylonitrile, polyacrylamide, poly(hydroxy(meth)acrylate), and a styrene/maleic acid copolymer; poly(vinyl chloride), polytetrafluoroethylene, poly(vinylidene fluoride), a tetrafluoroethylene/hexafluoropropylene copolymer, a vinylidene fluoride/tetrafluoroethylene/hexafluoropropylene copolymer, polyethylene, polypropylene, an ethylene/propylene/diene terpolymer (EPDM), a sulfonated EPDM, a poly(vinyl acetal) resin, (meth)acrylic acid ester copolymers containing (meth)acrylic acid esters, such as methyl methacrylate and 2-ethylhexyl acrylate; a (meth)acrylic acid ester/acrylonitrile copolymer; a poly(vinyl ester) copolymer containing a vinyl ester, such as vinyl acetate; a styrene/butadiene copolymer, an acrylonitrile/butadiene copolymer, polybutadiene, a neoprene rubber, a fluorine rubber, poly(ethylene oxide), a polyester/polyurethane resin, a polyether/polyurethane resin, a polycarbonate/polyurethane resin, a polyester resin, a phenolic resin, and an epoxy resin. More preferred examples include a poly(acrylic acid ester)-based latex, carboxymethyl cellulose, polytetrafluoroethylene, and poly(vinylidene fluoride).

As for the binder, one kind may be used alone, or two or more kinds may be used as a mixture. If the amount of addition of the binder is too small, the maintenance power and the aggregating power of the electrode mixture are weakened. If the amount of addition of the binder is too large, the electrode volume increases, and the capacity per unit volume or unit mass of the electrode is lowered. For such reasons, the amount of addition of the binder is preferably from 1 mass % to 30 mass %, and more preferably from 2 mass % to 10 mass %.

Filler

The electrode mixture may contain a filler. Regarding the material that forms the filler, any fibrous material that does not cause any chemical change in the secondary battery of the present invention is preferable. Usually, fibrous fillers formed from olefinic polymers, such as polypropylene and polyethylene, and materials, such as glass and carbon, are used. The amount of addition of the filler is not particularly limited, but the amount of addition is preferably from 0 mass % to 30 mass % in the dispersion.

Current Collector

As the current collector for the positive and negative electrodes, an electron conductor that does not cause any chemical change in the non-aqueous electrolyte secondary battery of the present invention, is used. Preferred examples of the current collector for the positive electrode include aluminum, stainless steel, nickel, and titanium, as well as aluminum or stainless steel treated with carbon, nickel, titanium, or silver on the surface. Among them, aluminum and aluminum alloys are more preferred.

Preferred examples of the current collector for the negative electrode include aluminum, copper, stainless steel, nickel, and titanium, and more preferred examples include aluminum, copper, and copper alloys.

Regarding the shape of the current collector, a film sheet-shaped current collector is usually used, but a net-shaped material, a film sheet formed by punching, a lath material, a porous material, a foam, a material obtained by molding a group of fibers, and the like can also be used. The thickness of the current collector is not particularly limited, but the thickness is preferably from 1 nm to 500 nm. Furthermore, it is also preferable to provide surface unevenness on the surface of the current collector through a surface treatment.

Electrode mixtures for lithium secondary batteries are formed by members appropriately selected from these materials.

(Separator)

The separator used in the non-aqueous secondary battery of the present invention is preferably formed of a material which electronically insulates the positive electrode and the negative electrode, and has mechanical strength, ion permeability, and oxidation-reduction resistance at the surfaces in contact with the positive electrode and the negative electrode. Examples of such a material that may be used include porous polymer materials or inorganic materials, organic-inorganic hybrid materials, and glass fibers. These separators preferably have a shutdown function for securing safety, that is, a function of increasing resistance by blocking the spaces at 80° C. or more, and thereby cutting off the electric current, and the blocking temperature is preferably from 90° C. to 180° C.

The shape of the pores of the separator is usually circular or elliptical, and the size is from 0.05 µm to 30 µm, and preferably from 0.1 µm to 20 µm. Furthermore, as in the case of producing the material by an extension method or a phase separation method, a material having rod-shaped or irregularly shaped pores may also be used. The proportion occupied by these pores, that is, the pore ratio, is 20% to 90%, and preferably 35% to 80%.

Regarding the polymer materials described above, a single material, such as cellulose nonwoven fabric, polyethylene, or polypropylene, may be used, or a compositized material of two or more kinds may also be used. A laminate of two or more kinds of finely porous films that are different in the pore size, pore ratio, pore blocking temperature and the like, is preferred.

As the inorganic material, oxides, such as alumina and silicon dioxide, nitrides, such as aluminum nitride and silicon nitride, and sulfates, such as barium sulfate and calcium sulfate, are used, and a particle-shaped or fiber-shaped material is used. Regarding the form, a thin film-shaped material, such as a nonwoven fabric, a woven fabric, or a finely porous film, is used. In the case of a thin film-shaped material, a material having a pore size from 0.01 µm to 1 µm and a thickness from 5 µm to 50 µm is favorably used. In addition to the independent thin film-shaped materials described above, a separator obtained by forming a composite porous layer containing particles of the inorganic substance described above, as a surface layer of the positive electrode and/or the negative electrode by using a binder made of a resin, can be employed. For example, a separator in which alumina particles having a 90% particle size of less than 1 µm are formed on both surfaces of the positive electrode, as porous layers by using a binder of a fluororesin, may be used.

(Preparation of Non-Aqueous Secondary Battery)

As the shape of the non-aqueous secondary battery of the present invention, any form, such as a sheet form, a rectangular form, or a cylindrical form, can be applied to, as described above. The mixture of the positive electrode active substance or the negative electrode active substance is mainly used, after being applied (coated) on a current collector, dried, and compressed.

Hereinafter, a bottomed cylindrical lithium secondary battery 100 will be taken as an example, and its configuration and a production method thereof will be described with reference to FIG. 2. In a battery having a bottomed cylindrical shape, since the external surface area relative to the power generating element to be charged is small, it is preferable to design the battery such that the Joule heating that is generated due to the internal resistance at the time of charging or discharging is efficiently dissipated to the outside. Furthermore, it is preferable to design the lithium secondary battery such that the filling ratio of a substance having high heat conductibility is increased so as to lower the temperature distribution inside the battery. FIG. 2 is an example of a bottomed cylindrical lithium secondary battery 100. This cell is a bottomed cylindrical lithium secondary battery 100 in which a positive electrode sheet 14 and a negative electrode sheet 16 that are superimposed with a separator 12 interposed therebetween, are wound and accommodated in a packaging can 18. In addition, reference numeral 20 in the diagram represents an insulating plate, 22 represents an opening sealing plate, 24 represents a positive electrode current collector, 26 represents a gasket, 28 represents a pressure-sensitive valve body, and 30 represents a current blocking element. Meanwhile, the diagram inside the magnified circle is indicated with varying hatchings in consideration of visibility, but the various members are equivalent to the overall diagram by the reference numerals.

First, a negative electrode active substance is mixed with a solution prepared by dissolving a binder, a filler and the like that are used as desired in an organic solvent, and thus a negative electrode mixture is prepared in a slurry form or in a paste form. The negative electrode mixture thus obtained is uniformly applied over the entire surface of both sides of a metal core as a current collector, and then the organic solvent is removed to form a negative electrode mixture layer. Furthermore, the laminate of the current collector and the negative electrode mixture layer is rolled by using a roll pressing machine or the like, to produce a laminate having a predetermined thickness, and thereby, a negative electrode sheet (electrode sheet) is obtained. At this time, the application method for each agent, the drying of applied matter, and the formation method for positive and negative electrodes may conform to the usual method.

In the present embodiment, a cylindrical battery has been explained as an example, but the present invention is not limited to this. For example, positive and negative electrode sheets produced by the methods described above are superimposed with a separator interposed therebetween, and then the assembly may be processed directly into a sheet-like battery. Alternatively, a rectangular-shaped battery may be formed by folding the assembly, inserting the assembly into a rectangular can, electrically connecting the can with the sheet, subsequently injecting an electrolyte, and sealing the opening by using an opening sealing plate.

In all of the embodiments, a safety valve can be used as an opening sealing plate for sealing the opening. Furthermore, an opening sealing member may be equipped with various safety elements that are conventionally known, in addition to the safety valve. For example, as overcurrent preventing elements, a fuse, a bimetal, a PTC element and the like are favorably used.

Furthermore, as a countermeasure for an increase in the internal pressure of the battery can, a method of inserting a slit in the battery can, a gasket cracking method, an opening sealing plate cracking method, or a method of disconnecting from a lead plate can be used in addition to the method of providing a safety valve. Furthermore, a protective circuit incorporated with an overcharge-coping member or an overdischarge-coping member may be provided to a charging machine, or the aforementioned protective circuit may be provided independently.

For the can or the lead plate, a metal or an alloy having electrical conductibility can be used. For example, metals, such as iron, nickel, titanium, chromium, molybdenum, copper, and aluminum, or alloys thereof are favorably used.

For the welding method that may be used when a cap, a can, a sheet, and a lead plate are welded, any known methods (for example, an electric welding method using a direct current or an alternating current, a laser welding method, an ultrasonic welding method, and the like) can be used. As the sealing agent for sealing an opening, any conventionally known compounds, such as asphalt, and mixtures can be used.

[Use of Non-Aqueous Secondary Battery]

Non-aqueous secondary batteries of the present invention are applied to various applications, since secondary batteries having satisfactory cycle characteristics can be produced.

There are no particular limitations on the application embodiment for the non-aqueous secondary battery, but in the case of mounting the non-aqueous secondary battery in electronic equipment, examples of the equipment include notebook computers, pen-input personal computers, mobile personal computers, electronic book players, mobile telephones, cordless phone handsets, pagers, handy terminals, portable facsimiles, portable copying machines, portable printers, headphone stereo sets, video movie cameras, liquid crystal television sets, handy cleaners, portable CD players, mini disc players, electric shavers, transceivers, electronic organizers, calculators, memory cards, portable tape recorders, radios, backup power supplies, and memory cards. Other additional applications for consumer use include automobiles, electromotive vehicles, motors, lighting devices, toys, game players, load conditioners, timepieces, strobes, cameras, and medical devices (pacemakers, hearing aids, shoulder massaging machines, and the like). Furthermore, the non-aqueous secondary battery can be used as various batteries for munition and space batteries. Also, the non-aqueous secondary battery can be combined with a solar cell.

There are no particular limitations on the application embodiment of the non-aqueous liquid electrolyte for a secondary battery of the present invention, but the non-aqueous liquid electrolyte is preferably used for applications in which a high-temperature use is supposed, from the viewpoint that it provides advantages to high-temperature preservation property and high-rate discharge characteristics. For example, electric vehicles and the like are supposed to be exposed under a high temperature outdoors in a charged state. Further, in the electric vehicles, the high-rate discharge is required at the time of starting or acceleration, and thus resistance to deterioration of high-rate discharge capacity even under high-temperature preservation becomes important. The present invention is favorably able to correspond to such types of usage, thereby exerting its excellent effects.

EXAMPLES

Hereinafter, the present invention will be described in more detail with reference to examples, but the present invention is not limited to these examples.

Example 1/Comparative Example 1

Preparation of Liquid Electrolyte

The components shown in Table 1 were added to a liquid electrolyte of 1M $LiBF_4$ ethylene carbonate/γ-butyrolactone at a volume ratio of 3:7 by the amount described in Table 1, to prepare liquid electrolytes of this invention and liquid electrolytes of the comparative example. All viscosities at 25° C. of the thus-prepared liquid electrolytes were 5 mPa·s or less.

<Preparation of Battery (1)>

A positive electrode was produced by using an active material: lithium nickel manganese cobalt oxide ($LiNi_{1/3}Mn_{1/3}Co_{1/3}O_2$) 85 mass %, a conductive aid: carbon black 7 mass %, and a binder: PVDF 8 mass %, and a negative electrode was produced by using an active material: lithium titanium oxide ($Li_4Ti_5O_{12}$) 94 mass %, a conductive aid: carbon black 3 mass %, and a binder: PVDF 3 mass %. A separator was 50 μm thick made of cellulose. A 2032-type coin battery was produced for each test liquid electrolyte by using the above-mentioned positive and negative electrodes and separator, to evaluate the following items. The results are shown in Table 1.

Discharge Capacity Maintenance Rate after High-Temperature Storage

<1 C Discharge Capacity Maintenance Ratio [1 C Discharge]>

In a thermostatic chamber at 30° C., the battery was subjected to constant current charging at 0.1 C until the battery voltage reached 2.75 V, followed by subjecting to charging at a constant voltage of 2.75 V until the current value reached 0.12 mA or for 2 hours. Then, the respective resultant battery was subjected to constant current discharging at 1 C in a thermostatic chamber at 30° C. until the battery voltage reached 1.2 V, whereby the initial 1 C discharge capacity was measured. After carrying out discharge again under the foregoing conditions, the charged battery was stored for 10 days in a thermostatic chamber at 60° C. Then, in the thermostatic chamber at 30° C., 1 C constant current discharge was carried out until the battery voltage became 1.2 V, whereby the 1 C discharge capacity after storage was measured. The 1 C discharge capacity maintenance ratio was calculated by the following formula. As the value becomes larger, the capacity is less deteriorated even under the high-temperature storage, which is preferable.

(1C discharge capacity maintenance ratio)(%)={(1C discharge capacity after storage)/(Initial 1C discharge capacity)}×100

<4 C Discharge Capacity Maintenance Ratio [4 C Discharge]>

The initial 4 C discharge capacity and the 4 C discharge capacity after storage were measured in the same manner as the 1 C discharge capacity maintenance rate, except that the constant current discharge was carried out by 4 C. The 4 C discharge capacity maintenance ratio was calculated by the following formula.

4C discharge capacity maintenance ratio (%)={(4C discharge capacity after storage)/(Initial 4C discharge capacity)}×100

TABLE 1

| Test No. | Compound (A) Comp. | Conc. (mass %) | Compound (B) Comp. | Conc. (mass %) | Other component Comp. | Conc. (mass %) | 1C discharge (%) | 4C discharge (%) |
|---|---|---|---|---|---|---|---|---|
| 101 | I-1a | 5 | | | | | 88 | 73 |
| 102 | I-1a | 1 | | | | | 90 | 75 |
| 103 | I-1a | 0.5 | | | | | 91 | 80 |
| 104 | I-1a | 0.1 | | | | | 91 | 80 |
| 105 | I-1a | 0.1 | B1 | 0.01 | | | 93 | 84 |
| 106 | I-1b | 0.5 | | | | | 91 | 78 |
| 107 | I-1c | 0.5 | | | | | 94 | 83 |
| 108 | I-1d | 0.5 | | | | | 94 | 85 |
| 109 | I-1d | 0.1 | B2 | 0.01 | | | 96 | 90 |
| 110 | I-1e | 0.5 | | | | | 94 | 88 |
| 111 | I-1f | 0.5 | | | | | 95 | 90 |
| 112 | I-1f | 0.1 | B2 | 0.01 | | | 96 | 92 |
| 113 | I-2a | 0.5 | | | | | 85 | 78 |
| 114 | I-2b | 0.5 | | | | | 85 | 80 |
| 115 | I-2c | 0.5 | | | | | 86 | 78 |
| 116 | I-2d | 0.5 | | | | | 86 | 80 |
| 117 | I-3a | 0.5 | | | | | 85 | 73 |
| 118 | I-3b | 0.5 | | | | | 85 | 75 |
| 119 | I-3c | 0.5 | | | | | 85 | 75 |
| 120 | I-1f | 0.1 | B2 | 0.01 | VC | 1 | 96 | 92 |
| 121 | I-1f | 0.5 | | | VEC | 1 | 95 | 90 |
| 122 | I-1f | 0.5 | | | FEC | 1 | 95 | 90 |
| 123 | 1-1g | 0.2 | B2 | 0.005 | | | 96 | 89 |
| 124 | I-1h | 0.05 | | | | | 95 | 90 |
| 125 | I-1i | 0.05 | | | | | 96 | 90 |
| 126 | I-2e | 0.05 | B2 | 0.005 | | | 85 | 79 |
| 127 | I-2f | 0.05 | B2 | 0.005 | | | 86 | 78 |
| 128 | I-2g | 0.2 | B2 | 0.005 | | | 84 | 77 |
| c11 | | | | | | | 85 | 68 |
| c12 | X1 | 0.5 | | | | | 81 | 56 |
| c13 | X2 | 0.5 | | | | | 85 | 66 |
| c14 | X1 | 0.5 | B1 | 0.01 | | | 81 | 56 |
| c15 | X2 | 0.5 | B1 | 0.01 | | | 84 | 66 |

<Notes in Tables>
Test No.: Nos. beginning with 'c' are Comparative examples, and Nos. except those are Examples according to this invention.
Comp.: The numbers of Exemplary compound (see the following chemical formulae)
Conc.: Concentration to the total amount of the liquid electrolyte Compound (A)

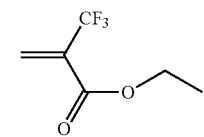

I-1a

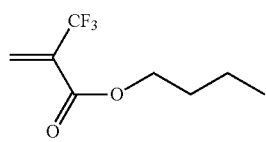

I-1b

-continued

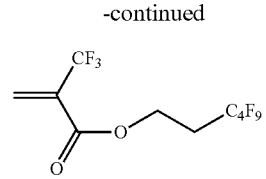

I-1c

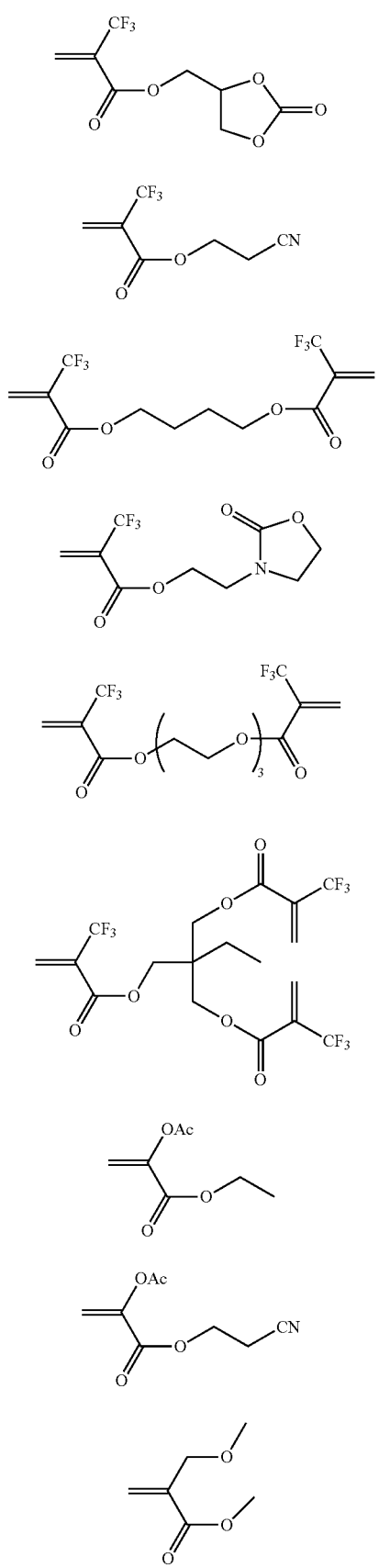
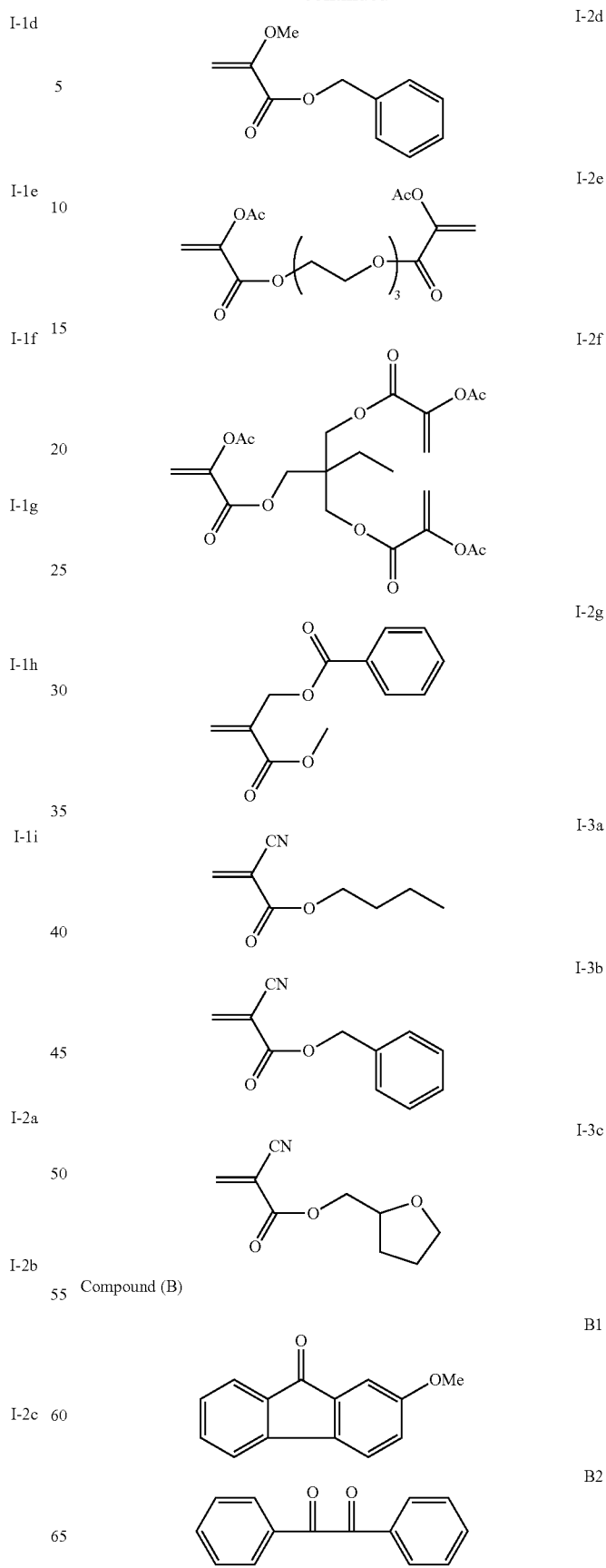

Compound for Comparison

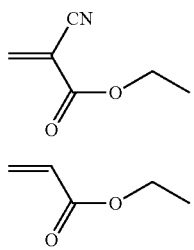

X1

X2

Other Compound

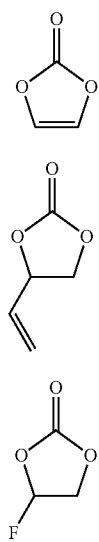

VC

VEC

FEC

Me: methyl group
Ac: acetyl group

From the results shown above, it is understood that the non-aqueous liquid electrolyte for a secondary battery of the present invention exhibits superior performance in terms of capacity maintenance property and high-rate discharge characteristics after the high-temperature storage, as compared with those using compounds (X1, X2) found in known references.

Example 2/Comparative Example 2

Preparation of Liquid Electrolyte

The components shown in Table 2 were added to a liquid electrolyte of 1M $LiPF_6$ ethylene carbonate/methyl ethyl carbonate at a volume ratio of 1:2 by the amount described in Table 2, to prepare liquid electrolytes corresponding to each sample numbers. All viscosities at 25° C. of the thus-prepared liquid electrolytes were 5 mPa·s or less.

Preparation of Battery (2)

The positive electrode active material in the Battery (1) was replaced with lithium cobalt oxide ($LiCoO_2$). A negative electrode was produced by using an active material: graphite 86 mass %, a conductive aid: carbon black 6 mass %, and a binder: PVDF 8 mass %. A separator was 25 μm thick made of polypropylene. A 2032-type coin battery was produced for the liquid electrolyte of each test Nos. by using the above-mentioned positive and negative electrodes and separator, to evaluate the following items. The results are shown in Table 2.

<1 C Discharge Capacity Maintenance Ratio>

A test was carried out in the same manner as described above, except that the voltage after charge was changed from 2.75V to 4.2V, and that the voltage at the time of constant current discharge was changed from 1.2V to 2.75V. The calculation formula of the capacity maintenance rate (%) is the same as above.

<4 C Discharge Capacity Maintenance Ratio>

Measurement of the 4 C discharge capacity maintenance rate was also carried out according to the same changes from Example 1 as in the 1 C discharge capacity maintenance rate.

TABLE 2

| Test* No. | Compound (A) Comp. | Conc. (mass %) | Compound (B) Comp. | Conc. (mass %) | Other component Comp. | Conc. (mass %) | 1C discharge (%) | 4C discharge (%) |
|---|---|---|---|---|---|---|---|---|
| 201 | I-1a | 5 | | | | | 78 | 60 |
| 202 | I-1a | 1 | | | | | 81 | 63 |
| 203 | I-1a | 0.5 | | | | | 82 | 65 |
| 204 | I-1a | 0.1 | | | | | 84 | 65 |
| 205 | I-1a | 0.1 | B1 | 0.01 | | | 87 | 78 |
| 206 | I-1b | 0.5 | | | | | 86 | 76 |
| 207 | I-1c | 0.5 | | | | | 84 | 76 |
| 208 | I-1d | 0.5 | | | | | 89 | 80 |
| 209 | I-1d | 0.1 | B2 | 0.01 | | | 90 | 82 |
| 210 | I-1e | 0.5 | | | | | 88 | 84 |
| 211 | I-1f | 0.5 | | | | | 88 | 82 |
| 212 | I-1f | 0.1 | B2 | 0.01 | | | 92 | 84 |
| 213 | I-2a | 0.5 | | | | | 80 | 62 |
| 214 | I-2b | 0.5 | | | | | 82 | 64 |
| 215 | I-2c | 0.5 | | | | | 80 | 61 |
| 216 | I-2d | 0.5 | | | | | 83 | 64 |
| 217 | I-3a | 0.5 | | | | | 79 | 60 |
| 218 | I-3b | 0.5 | | | | | 78 | 60 |
| 219 | I-3c | 0.5 | | | | | 79 | 60 |
| 220 | I-1f | 0.1 | B2 | 0.01 | VC | 1 | 92 | 84 |
| 221 | I-1f | 0.5 | | | VEC | 1 | 88 | 82 |
| 222 | I-1f | 0.5 | | | FEC | 1 | 88 | 82 |
| 223 | 1-1g | 0.2 | B2 | 0.005 | | | 90 | 82 |
| 224 | I-1h | 0.05 | | | | | 90 | 84 |
| 225 | I-1i | 0.05 | | | | | 89 | 83 |

TABLE 2-continued

| Test* No. | Compound (A) Comp. | Conc. (mass %) | Compound (B) Comp. | Conc. (mass %) | Other component Comp. | Conc. (mass %) | 1C discharge (%) | 4C discharge (%) |
|---|---|---|---|---|---|---|---|---|
| c21 |  |  |  |  |  |  | 68 | 48 |
| c22 | X1 | 0.5 |  |  |  |  | 62 | 40 |
| c23 | X2 | 0.5 |  |  |  |  | 68 | 48 |
| c24 | X1 | 0.5 | B1 | 0.01 |  |  | 61 | 41 |
| c25 | X2 | 0.5 | B1 | 0.01 |  |  | 68 | 48 |

From the results shown above, it is understood that the non-aqueous liquid electrolyte for a secondary battery of the present invention exhibits superior performance in terms of capacity maintenance property and high-rate discharge characteristics after the high-temperature storage, as compared with those using compounds (X1, X2) found in known references, despite the use of a carbon-based negative electrode in which tougher conditions are required when the operation potential is lower.

The above-described Examples are shown that excellent properties were exhibited in the batteries in which the liquid electrolyte of the present invention was used in combination with a lithium titanium oxide negative electrode or a carbon material negative electrode. However, it is presumed that the liquid electrolyte of the present invention would exhibit similarly excellent effects in batteries having: a metal or metal oxide negative electrode which is under development toward higher and higher levels of capacity, the metal or metal oxide being capable of forming an alloy with lithium (preferably Si, Si oxide, Si/Si oxide, Sn, Sn oxide, $SnB_x$-$P_yO_z$, Cu/Sn and a composite body of at least two selected from among these materials); or a negative electrode which is composed of a composite body of such metal or metal oxide with a carbon material.

Having described my invention as related to the present embodiments, it is my intention that the invention not be limited by any of the details of the description, unless otherwise specified, but rather be construed broadly within its spirit and scope as set out in the accompanying claims.

REFERENCE SIGNS LIST

1 Positive electrode conductive material
2 Positive electrode active material
3 Negative electrode conductive material
4 Negative electrode active material
5 Liquid electrolyte
6 Operating means
7 Circuit wiring
9 Separator
10 Lithium ion secondary battery
12 Separator
14 Positive electrode sheet
16 Negative electrode sheet
18 Packaging can double as a negative electrode
20 Insulating plate
22 Opening sealing plate
24 Positive electrode current collector
26 Gasket
28 Pressure-sensitive valve body
30 Current blocking element
100 Bottomed cylindrical lithium secondary battery

The invention claimed is:

1. A non-aqueous liquid electrolyte for a secondary battery, containing an electrolyte and a compound (A) represented by any one of formulae (I-1) to (I-3) in an organic solvent:

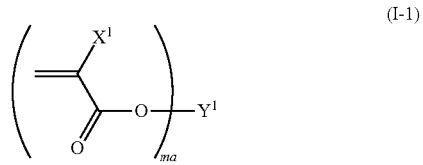

(I-1)

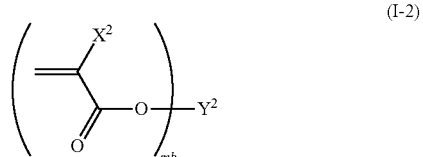

(I-2)

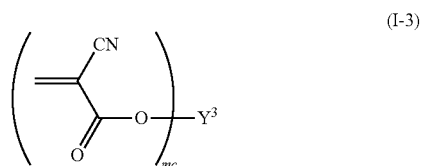

(I-3)

wherein, in formula (I-1), $X^1$ represents an alkyl group substituted with a halogen atom;

$Y^1$ represents a hydrogen atom or an organic group; and ma represents an integer from 1 to 6;

wherein, in formula (I-2), $X^2$ represents a group having an oxygen atom; $Y^2$ represents a hydrogen atom or an organic group; and mb represents an integer from 1 to 6; and wherein, in formula (I-3), $Y^3$ represents a structure represented by any one of formulas (Ex-1) to (Ex-5); and mc represents an integer from 1 to 6;

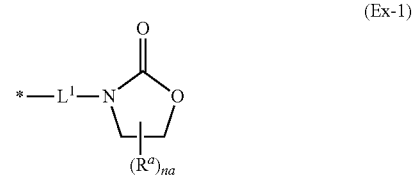

(Ex-1)

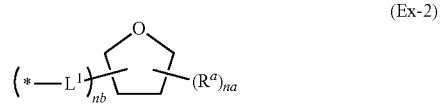

(Ex-2)

-continued

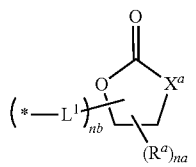

(Ex-3)

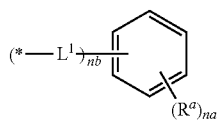

(Ex-4)

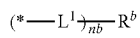

(Ex-5)

wherein $L^1$ is a single bond or a linking group; $R^a$ an alkyl group, a halogen atom, or a fluorinated alkyl group; na is an integer from 0 to 2; nb is an integer from 1 to 3; r represents an oxygen atom or $-CR_2-$; R represents a hydrogen atom or an alkyl group; $R^{b'}$ represents a cyclic hydrocarbon group having 4 to 20 carbon atoms in the case of mc=1, and $R^b$ represents a hydrocarbon group having 4 to 20 carbon atoms in the case of mc-2 to 6; $R^{b'}$ may have a branched structure in the middle of the group, and a structure having -$L^1$-* at the end thereof may be present; and * designates an atomic bonding, wherein said non-aqueous liquid electrolyte for a secondary battery further containing a compound (B) releasing, upon oxidation or reduction, an active species that reacts with the compound (A) represented by any one of formulae (I-1) to (I-3), and wherein the compound (B) comprises at least one compound selected from the group consisting of acetophenone compounds, benzophenone compounds, anthrone compounds, xanthone compounds, dibenzosuberone compounds, dibenzosuberenone compounds, anthraquinone compounds, bianthronyl compounds, bianthrone compounds, and dibenzoyl compounds.

2. The non-aqueous liquid electrolyte for a secondary battery as claimed in claim 1, wherein a content of the compound (A) is from 0.001 to 10 mass % with respect to the total amount of the liquid electrolyte.

3. The non-aqueous liquid electrolyte for a secondary battery as claimed in claim 1, wherein a content of the compound (B) is from 0.0001 to 10 mass % with respect to the total amount of the liquid electrolyte.

4. The non-aqueous liquid electrolyte for a secondary battery as claimed in claim 1, wherein an addition amount ratio (A/B) of the compound (A) to the compound (B) is from 100/1 to 1/10.

5. The non-aqueous liquid electrolyte for a secondary battery as claimed in claim 1, wherein $X^1$ is an alkyl group substituted with a fluorine atom.

6. The non-aqueous liquid electrolyte for a secondary battery as claimed in claim 1, wherein $X^2$ is an alkoxy group, an alkoxymethyl group, an acyloxy group, or an acyloxymethyl group.

7. A non-aqueous liquid electrolyte secondary battery, containing:
a positive electrode;
a negative electrode; and
the non-aqueous liquid electrolyte for a secondary battery as claimed in claim 1.

8. The non-aqueous liquid electrolyte secondary battery as claimed in claim 7, wherein a compound having at least one of nickel, cobalt, or manganese is used as an active material of the positive electrode.

9. The non-aqueous liquid electrolyte secondary batter as claimed in claim 7, wherein lithium titanate or a carbon material is used as an active material of the negative electrode.

10. A kit of a non-aqueous liquid electrolyte for a secondary battery, wherein a chemical agent containing a compound (A) represented by any one of formulae (I-1) to (I-3) is combined with a chemical agent containing an electrolyte:

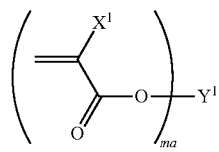

(I-1)

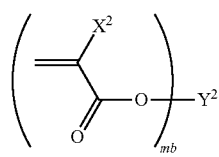

(I-2)

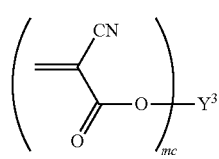

(I-3)

wherein, in formula (I-1), $X^1$ represents an alkyl group substituted with a halogen atom;
$Y^1$ represents a hydrogen atom or an organic group; and ma represents an integer from 1 to 6;
wherein, in formula (I-2), $X^2$ represents a group having an oxygen atom; $Y^2$ represents a hydrogen atom or an organic group; and mb represents an integer from 1 to 6; and
wherein, in formula (I-3), $Y^3$ represents a structure represented by any one of formulas (Ex-1) to (Ex-5); and mc represents an integer from 1 to 6:

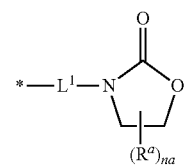

(Ex-1)

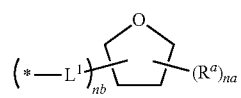

(Ex-2)

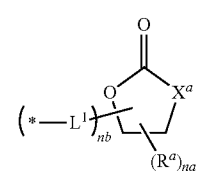

(Ex-3)

-continued

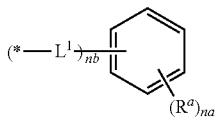
(Ex-4)

(Ex-5)

wherein $L^1$ is a single bond or a linking group; $R^a$ an alkyl group, a halogen atom, or a fluorinated alkyl group; na is an integer from 0 to 2; nb is an integer from 1 to 3; $X^a$ represents an oxygen atom or —$CR_2$—; R represents a hydrogen atom or an alkyl group; $R^{b'}$ represents a cyclic hydrocarbon group having 4 to 20 carbon atoms in the case of mc=1, and $R^{b'}$ represents a hydrocarbon group having 4 to 20 carbon atoms in the case of mc=2 to 6; $R^{b'}$ may have a branched structure in the middle of the group, and a structure having -$L^1$-* at the end thereof may be present; and * designates an atomic bonding, wherein said non-aqueous liquid electrolyte for a secondary battery further containing a compound (B) releasing, upon oxidation or reduction, an active species that reacts with the compound (A) represented by any one of formulae (I-1) to (I-3), and wherein the compound (B) comprises at least one compound selected from the group consisting of acetophenone compounds, benzophenone compounds, anthrone compounds, xanthone compounds, dibenzosuberone compounds, dibenzosuberenone compounds, anthraquinone compounds, bianthronyl compounds, bianthrone compounds, and dibenzoyl compounds.

11. An additive for a non-aqueous secondary battery liquid electrolyte, comprising a compound (A) represented by any one of formulae (I-1) to (I-3):

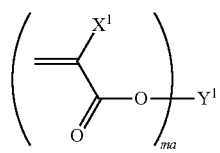
(I-1)

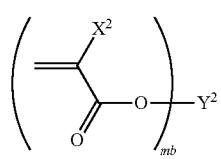
(I-2)

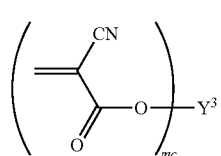
(I-3)

wherein, in formula (I-1), $X^1$ represents an alkyl group substituted with a halogen atom;
$Y^1$ represents a hydrogen atom or an organic group; and ma represents an integer from 1 to 6;
wherein, in formula (I-2), $X^2$ represents a group having an oxygen atom; $Y^2$ represents a hydrogen atom or an organic group; and mb represents an integer from 1 to 6; and wherein, in formula (I-3), $Y^3$ represents a structure represented by any one of formulas (Ex-1) to (Ex-5); and mc represents an integer from 1 to 6:

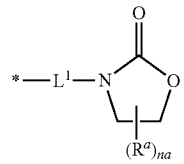
(Ex-1)

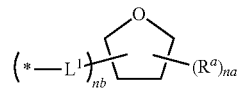
(Ex-2)

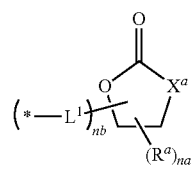
(Ex-3)

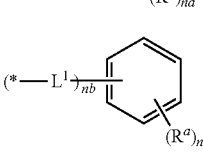
(Ex-4)

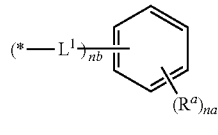

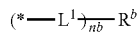
(Ex-5)

wherein $L^1$ is a single bond or a linking group; $R^a$ an alkyl group, a halogen atom, or a fluorinated alkyl group; na is an integer from 0 to 2; nb is an integer from 1 to 3; $X^a$ represents an oxygen atom or —$CR_2$—; R represents a hydrogen atom or an alkyl group; $R^{b'}$ represents a cyclic hydrocarbon group having 4 to 20 carbon atoms in the case of mc=1, and $R^{b'}$ represents a hydrocarbon group having 4 to 20 carbon atoms in the case of mc=2 to 6; $R^{b'}$ may have a branched structure in the middle of the group, and a structure having -$L^1$-* at the end thereof may be present; and * designates an atomic bonding, wherein said non-aqueous liquid electrolyte for a secondary battery further containing a compound (B) releasing, upon oxidation or reduction, an active species that reacts with the compound (A) represented by any one of formulae (I-1) to (I-3), and wherein the compound (B) comprises at least one compound selected from the group consisting of acetophenone compounds, benzophenone compounds, anthrone compounds, xanthone compounds, dibenzosuberone compounds, dibenzosuberenone compounds, anthraquinone compounds, bianthronyl compounds, bianthrone compounds, and dibenzoyl compounds.

12. The non-aqueous liquid electrolyte for a secondary battery as claimed in claim 1, wherein, in formula (I-2), $X^2$ represents an acetyloxy group, an acetyloxymethyl group, a methoxy group, a methoxymethyl group, an ethoxy group, a benzyl oxy group, or a benzoyloxymethyl group.

13. The non-aqueous liquid electrolyte for a secondary battery as claimed in claim 1, wherein, in formula (I-2), $X^2$ represents a methoxy group, a methoxymethyl group, an ethoxy group, a benzyl oxy group, or a benzoyloxymethyl group.

14. The non-aqueous liquid electrolyte for a secondary battery as claimed in claim 1, wherein the compound (B) comprises at least one compound selected from the group consisting of acetophenone compounds, benzophenone compounds, xanthone compounds, dibenzosuberone compounds, dibenzosuberenone compounds, anthraquinone compounds, bianthronyl compounds, bianthrone compounds, and dibenzoyl compounds.

15. The kit of a non-aqueous liquid electrolyte for a secondary battery as claimed in claim 10, wherein the compound (B) comprises at least one compound selected from the group consisting of acetophenone compounds, benzophenone compounds, xanthone compounds, dibenzosuberone compounds, dibenzosuberenone compounds, anthraquinone compounds, bianthronyl compounds, bianthrone compounds, and dibenzoyl compounds.

16. The additive for a non-aqueous secondary battery liquid electrolyte as claimed in claim 11, wherein the compound (B) comprises at least one compound selected from the group consisting of acetophenone compounds, benzophenone compounds, xanthone compounds, dibenzosuberone compounds, dibenzosuberenone compounds, anthraquinone compounds, bianthronyl compounds, bianthrone compounds, and dibenzoyl compounds.

* * * * *